United States Patent [19]

Maeda et al.

[11] Patent Number: 5,621,670

[45] Date of Patent: Apr. 15, 1997

[54] COMMUNICATION SERVICE SIMULATOR AND A COMMUNICATION SERVICE SPECIFICATION VERIFYING METHOD

[75] Inventors: Jun Maeda; Akiko Hiramatsu; Yasuo Iwami, all of Kawasaki, Japan

[73] Assignee: Fujitsu Limited, Kawasaki, Japan

[21] Appl. No.: 922,877

[22] Filed: Jul. 31, 1992

[30] Foreign Application Priority Data

Aug. 1, 1991 [JP] Japan .................................. 3-193264
Dec. 4, 1991 [JP] Japan .................................. 3-320268

[51] Int. Cl.⁶ .......................................................... H04M 3/24
[52] U.S. Cl. ............................ 364/578; 371/20.1; 379/11
[58] Field of Search ........................... 371/23, 68.2, 20.1; 364/578, 149, 232.3, 284; 395/500, 917, 920; 340/515; 379/9, 10, 11, 12, 13, 15, 18, 27

[56] References Cited

U.S. PATENT DOCUMENTS

| | | | |
|---|---|---|---|
| 3,692,961 | 9/1972 | Le Strat et al. | 379/11 X |
| 3,952,172 | 4/1976 | Penn et al. | 379/12 |
| 4,076,970 | 2/1978 | Lubarsky, Jr. et al. | 379/10 X |
| 4,238,649 | 12/1980 | Kemler | 379/18 X |
| 4,545,011 | 10/1985 | Lyon et al. | 371/20.1 X |
| 4,680,784 | 7/1987 | Lehnert et al. | 379/11 |
| 4,945,554 | 7/1990 | Krause et al. | 379/15 X |
| 5,065,422 | 11/1991 | Ishikawa | 379/11 |
| 5,241,580 | 8/1993 | Babson, III | 395/917 X |
| 5,243,380 | 9/1993 | Pesar et al. | 371/20.1 X |
| 5,295,177 | 3/1994 | Kakemizu et al. | 379/17 |

*Primary Examiner*—Edward R. Cosimano
*Assistant Examiner*—Eric W. Stamber

[57] ABSTRACT

A communication service simulator simulates communication service specification for a communication network having terminals and server nodes. The terminals of the communication network are registered in association with terminal data. When a called terminal has not been registered as terminal data during a simulation of a communication service specification, a terminal simulator registers the called terminal and the associated terminal data and displays the terminal data on a screen. A history regenerate/display unit displays on the screen any history of the content of a history storage unit. A simulation process controller copies a simulation process and separately executes and displays each of the processes when there is a branch, etc. in a communication service specification. During a simulation of a communication service specification, a sound output unit outputs a preselected sound from a first group of sounds when a preselected sound from a second group of sounds is received by a terminal specified by the identification information stored in a specified terminal identification information storage unit, and outputs a preselected sound from a third group of sounds, for a moment, in synchronism with the change on the screen of the terminal when the preselected sound from the second group of sounds is received by any terminal.

18 Claims, 20 Drawing Sheets

```
┌─ STATE : cs1: Collecting Info ──────────────┐
│                                              │
│ (x) if STATE = OPTIONAL then STATE = cs1: Collecting Info,
│  . . . . . . . . . . . . . .                 │
│  . . .                                       │
└──────────────────────────────────────────────┘

Fig. 15A

┌─ EVENT : number(cs1, leg 0, & r) ───────────┐
│                                              │
│ if STATE = cs1: Collecting Info and ANNOUNCEMENT = PSI
│ then INPUT = PSI INPUT ACCEPTED   x = INPUT NUMBER
│  . . . . . . . . . . . . . .                 │
│  . . .                                       │
└──────────────────────────────────────────────┘

─ EVENT : off-hook(cs1, leg 0) ─
if STATE : cs1 Collecting Info then ERROR(off-hook IMPOSSIBLE)
......

Fig.16B

─ DETERMINATION ─
if STATE = PSI authorization and r ≠ PASS and r ≠ ERROR then ERROR
......

Fig.16C

─ OPERATION: announcement(cs1, leg 0, PSI) ─
if INPUT = PSI INPUT ACCEPTED then ERROR(REDUNDANT INPUT? 0.5
......

Fig.16D if STATE = PSI authorization and r = PASS then VALID
if STATE = PSI authorization and r = ERROR then VALID STATE : cs1 : Collecting Info, PSI authorization
CONNECTION : (cs1, leg 0) ANNOUNCEMENT(PTN)
VARIABLE : x = 000. r = PAS
INPUT : PSI INPUT ACCEPTED

Fig. 17

COMMUNICATION SERVICE SIMULATOR AND A COMMUNICATION SERVICE SPECIFICATION VERIFYING METHOD

BACKGROUND OF THE INVENTION

The present invention relates to a technology for simulating and verifying the functions of a communication service specification, to be realized in a service program, to support the generation of the service program used in a communication system.

A communication service is realized in a switching unit, or an intelligent network, etc., and has become more and more vigorously diversified and complicated. This will tend to prevail in the near future with the increasing use of a broadband ISDN. Accordingly, it is desired that a service program for controlling a communication service can be generated quickly and easily.

A developer of a service first describes a specification of his communication service according to which a communication program is developed and tested. Therefore, the delay in detecting an error in the specification causes problems in the following steps of the specification described based on the preceding erroneous portion of the specification, thereby prolonging a successful completion in developing the service. Also, for developing a service easily and simply, it is desirable that only "describing a specification" is required in a service development, and the following steps such as developing a program, etc. can be performed through automatic conversions.

As described above, a highly efficient method of verifying a communication service specification is earnestly demanded.

In this connection, a process of generating a service program for use in an intelligent network is considered.

An intelligent network having a computer connected to a switching unit provides a highly efficient communication service. As shown in FIG. 1, it comprises a service switch node 101, a service control node 102, a number of telephone terminals (or terminals) 103, 104, . . .

The service switch node 101 comprises a number of switching units 101a, 101b, . . . , each switching unit comprising a communication line switch (SW), a central control processor (CCP), and, not shown in FIG. 1, a subscriber circuit, a trunk, etc.

The service control node 102 is configured by a computer and comprises a central processing unit (CPU), a storage unit MM for storing a service program SVP, and a data base DB, and transmits data to and from each switching unit.

In such an intelligent network, when a call designated by a specific number is generated by a calling subscriber A, calling switching unit 101a sends a specific number to the CPU of the service control node 102. According to a service program SVP, the CPU recognizes a service corresponding to the inputted specified number. If a free phone service, a personal number call service, etc. are requested the telephone number of a receiving subscriber B is obtained from the data base DB, and the result (the telephone number, etc.) is notified to the calling switching unit 101a. Thus, a normal path is established in the service switch node 101.

A service program in an intelligent network is generated as follows as shown in FIG. 2. That is, a user (a developer of a service) generates, using a specification editor SPED in a service management system 201, a communication service specification SSPC in which a specification of a service is described. Next, the user verifies whether or not the communication service specification SSPC is valid in the service management system 201. After the verification, the communication service specification SSPC is converted to a service program SVP in an executable form. The executable service program SVP thus obtained is loaded to the service control node 102 and used for a practical service.

The first technique for easily verifying a communication service specification in the intelligent network includes simulating the operation of each apparatus or unit for use in a service, displaying the configuration of the apparatus or unit on a screen, and outputting the result on a printer, etc. If this technique is successfully applied to a communication system in the intelligent network, the operator can simulate the operation of a communication service according to a communication service specification, display the result on a screen, or output the result as a sound, thereby realizing a communication service simulator capable of verifying a service specification in an interaction mode.

However, to simulate a communication service, the following specific problems must be solved.

Problem 1: A communication system incorporates a number of terminals. However, considering the efficiency of a data memory or the expansion of the scale of a system, it is not practical that all terminals are registered in a simulator. Additionally, there arises a problem of a less easy operation for a user when he registers all terminals before a simulation.

Problem 2: A screen display in a simulation operation indicates a time point in a series of service processes. Therefore, a user himself must memorize what kinds of operations he performed before and how the simulated communication system operated, thereby making it impossible for the user to memorize the entire history especially for a complicated service.

Problem 3: When a branch exists in a service, the operation must be repeated from the first service to the point of the branch to execute each of the operations following the branch as long as a simulator is operated sequentially.

Problem 4: When a sound output is simulated at each terminal in addition to a screen display, it is hard to exactly determine a terminal for outputting bell sounds, various sounds, or announcement, etc. because a plurality of terminals are displayed on a screen during a simulating operation.

Problem 5: During a simulating operation, a change in the state of a communication system is indicated as a change in a graphic representation on a screen, which requires a burden of visually searching for a change.

To efficiently verify a communication service specification, the above described user interface must be appropriately provided and the verification must be automatically performed.

That is, conventionally, a communication service specification is verified manually by a checker. A human being can verify a representation not in a formal language but in a natural language, and can perform a high level verification including a check for a semantic error as well as a logical error. However, a manual verification usually takes a long time and often overlooks errors. Therefore, it is desired that a communication service specification is stored in a computer in a formal language, and is verified automatically.

However, there is a problem that all errors contained in a communication service specification cannot be detected by an easy mechanical method because the determination as to whether or not a description in a communication service specification contains an error does not always depend on the description itself but instead, on another part in the specification. Moreover, some errors indicate logical inconsistency, and others indicate a semantic error, each being diversified in its own way.

SUMMARY OF THE INVENTION

The present invention has been developed based on the above described background, and aims at appropriately processing a change in the number of terminals, easily executing a history display and a branch operation in a service operation, and interlocking a screen display and a sound output in a service operation. Another object of the present invention is to verify a communication service specification flexibly, automatically, and easily at a high speed.

More specifically, the first basic configuration comprises a communication service specification storage unit, a user-operated input unit, a display unit, and a simulator for simulating a communication service specification according to an input from the user-operated input unit in an intelligent network.

The above described first basic configuration further comprises a terminal simulator for registering a terminal and displaying it on a display screen when it is not registered as a terminal data and receives a call during a simulation of a communication service specification.

The above described first basic configuration furthermore comprises a history storage unit for sequentially storing the state of each component and the operation of a user inputted by the user-operated input unit, and a history regenerate/display controller for displaying on a screen of a display unit an optional portion of the content of the history storage unit.

Then, the first basic configuration additionally comprises a simulation process controller for copying a simulation process during a simulation of a communication service specification, and independently executing it, and displaying each of the components simulated in each simulation process on a separate screen area, corresponding to each simulation process, on a screen of the display unit.

Additionally, the first basic configuration comprises a specified terminal identification information storage unit for storing identification information of a terminal specified by a user, and a sound output unit for outputting a predetermined sound when, during a simulation of a communication service specification, the predetermined sound is outputted to the terminal specified by the identification information stored in the specified terminal identification information storage unit.

Furthermore, the above described first basic configuration comprises a sound output unit for outputting the above described predetermined sound for a predetermined time synchronous with the change on the screen of the display unit of the terminal when, during a simulation of a communication service specification, an output operation of a predetermined sound for any terminal is performed.

The second basic configuration comprises an error detection rule storage unit, a communication service specification storage unit, a service execution state data storage unit, and a verification processor. The verification process is performed by sequentially repeating the operations of reading from the communication service specification storage unit, using a description element of a communication service specification for an intelligent network as a verification target; determining whether or not the verification target is valid by comparing the condition determined by the verification target and the data indicating the execution state of the current communication service stored in the service execution state data storage unit with the condition of the error detection rule stored in the error detection rule storage unit; outputting a detection result when the verification target is determined to be erroneous; executing a simulation of the communication service according to the verification target; and rewriting the data indicating the execution state of the communication service stored in the service execution state data storage unit when the verification target is determined not to be erroneous.

The above described second basic configuration further comprises a service simulation rule storage unit. In this case, the verification processor executes a simulation of a communication service according to the verification target, compares the condition determined by the verification target and the data indicating the execution state of the current communication service stored in the service execution state data with the condition of the service condition rule stored in the service simulation rule storage unit, and rewrites the content stored in the service execution state data storage unit according to the data indicating the execution state of the communication service generated according to the service simulation rule which coincides with the compared data when the verification processor determines the verification target not to be erroneous.

The above described second basic configuration realizes a system operated only by the validity detection rule instead of the error detection rule.

BRIEF DESCRIPTION OF THE DRAWINGS

The objects and features of the present invention can be easily recognized by referring to the preferred embodiments in this specification and the attached drawings.

In the drawings:

FIGS. 15A and 15B are views for explaining an example of a service simulation rule in the second embodiment;

FIGS. 16A through 16D shows an example of an erroneous detection rule in the second embodiment;

FIG. 17 shows an example of data indicating the state of the service execution in the second embodiment;

DESCRIPTION OF THE PREFERRED EMBODIMENTS

Figure 1:
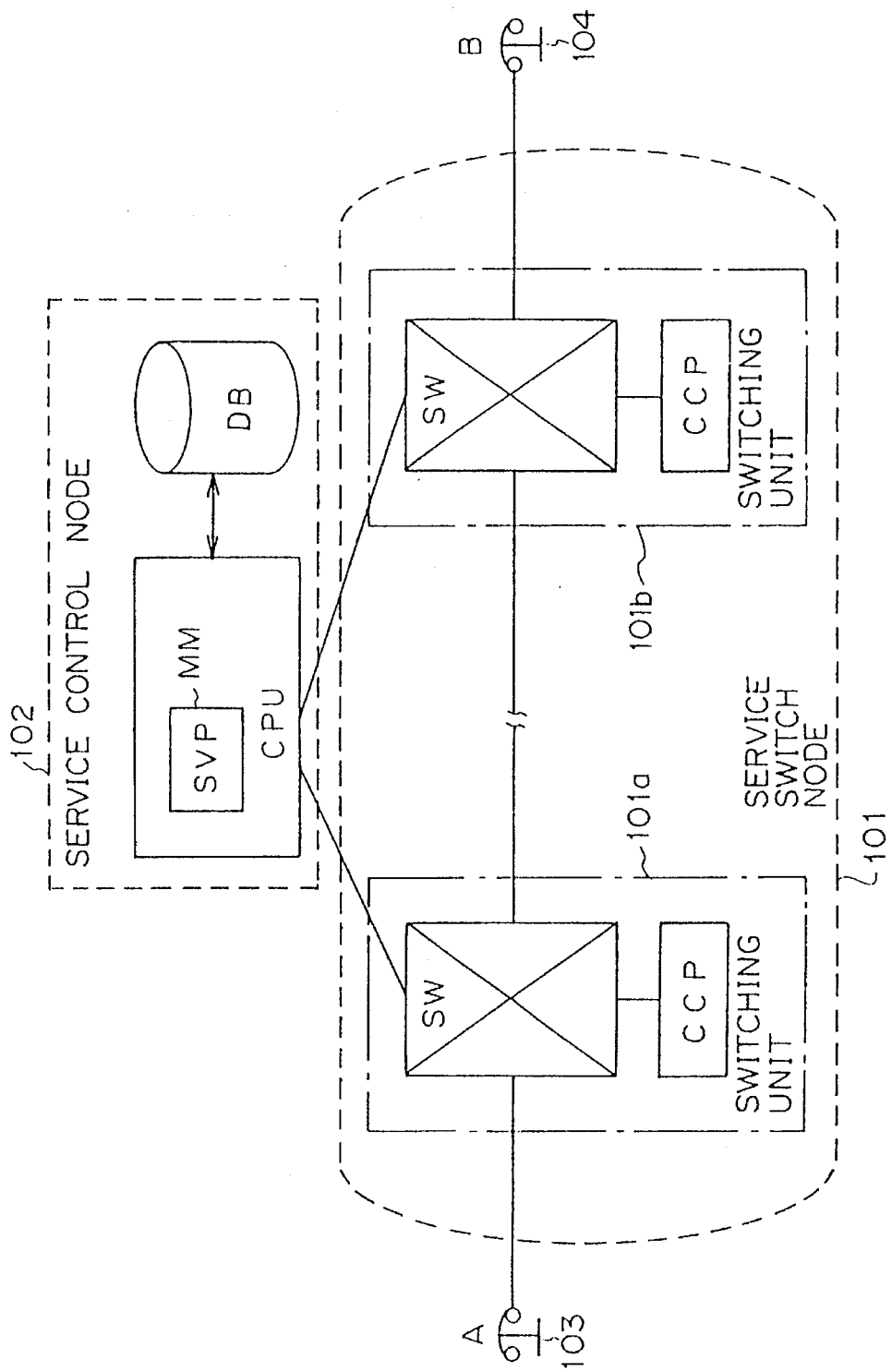
FIG. 1 shows the configuration of the intelligent network.
Figure 2:
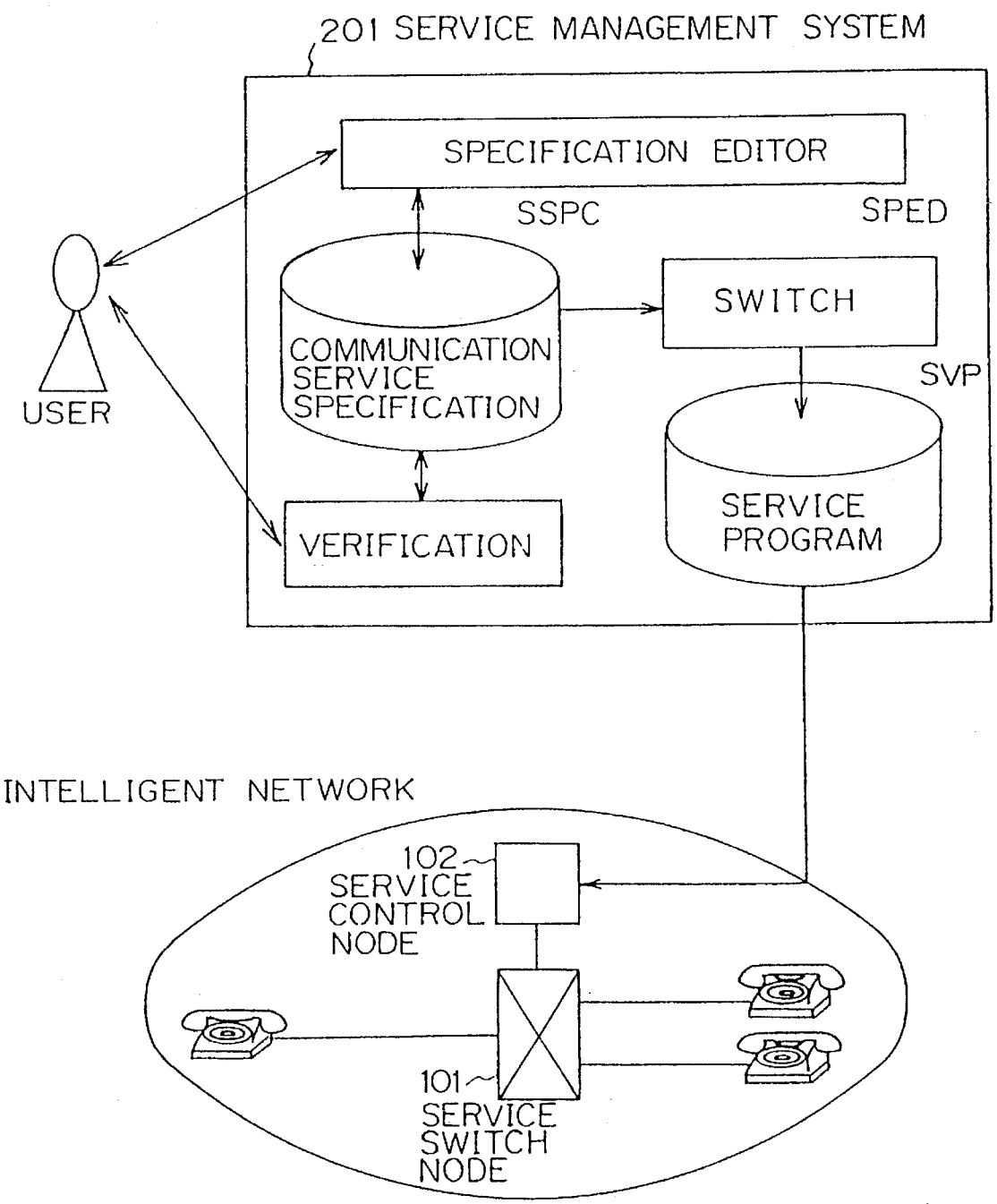
FIG. 2 is a view for explaining the summary from the development to the execution of a communication service.
Figure 3:
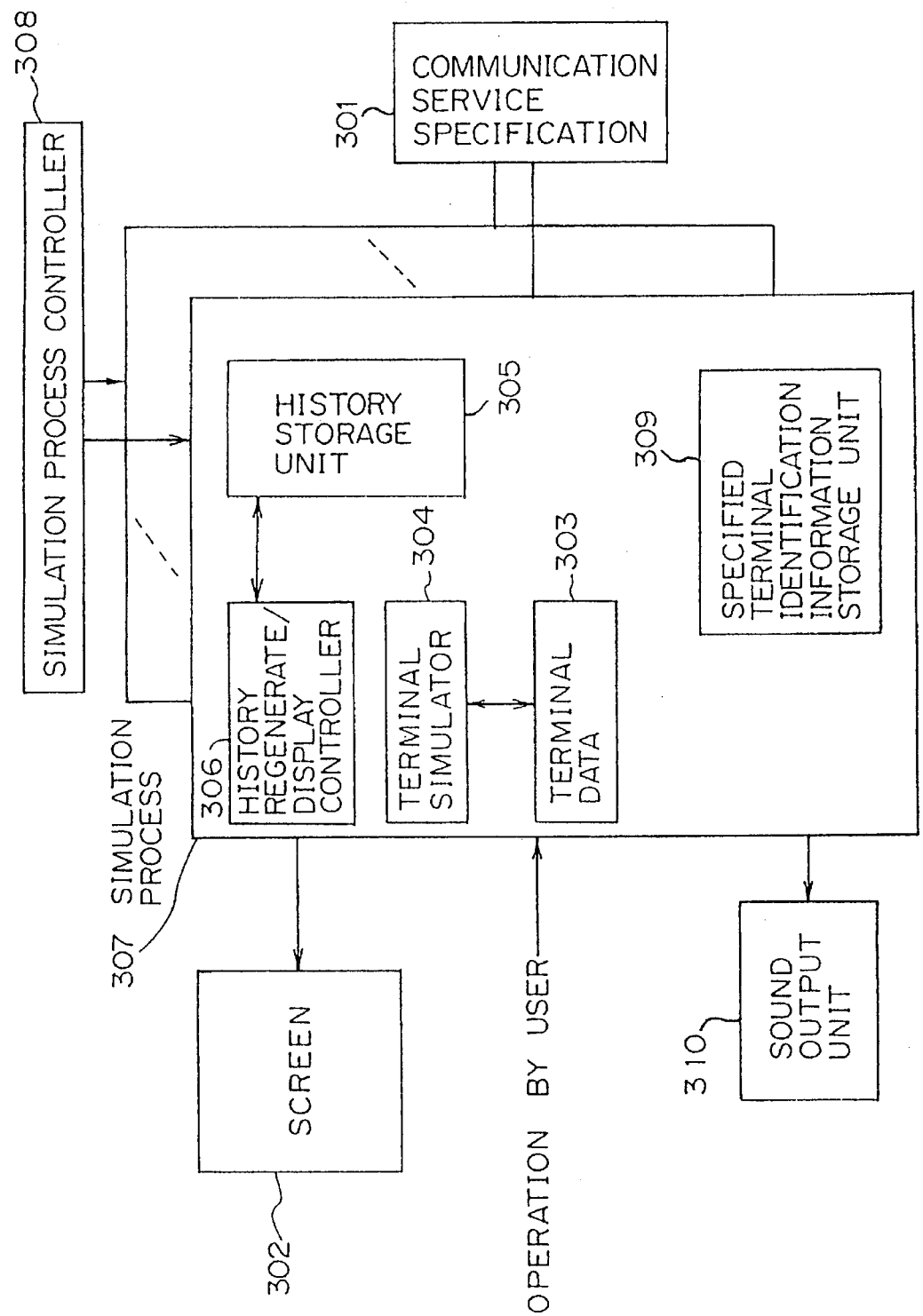
FIG. 3 is a block diagram for explaining the principle corresponding to the first through the fifth aspects of the present invention.

Explanation of the Principle of the first through the fifth aspects of the present invention FIG. 3 is a block diagram for explaining the principle of the first through the fifth aspects of the present invention. The first through the fifth aspects of the present invention relate to a communication service simulator for simulating a communication service specification 301 for an intelligent network by displaying, on a screen 302, components (terminals, switches, etc.) of a communication network operated by a user, each being controlled according to the communication service specification 301 to be simulated.

The first aspect of the present invention comprises a terminal simulator 304 for simulating the operation of a terminal, a component of the network, while controlling terminal data 303 corresponding to the terminal, registering the terminal as the terminal data 303 if a terminal being called is not registered as the terminal data 303 during the simulation of the communication service specification 301, and displaying the terminal on the screen 302.

With the above described configuration, if a terminal not yet registered receives a call during the simulation of the communication service specification 301, it is automatically registered as the terminal data 303 and displayed on the screen. Therefore, the user need not register a receiving terminal before starting a simulation, thereby improving the operability of a simulator.

The second aspect of the present invention comprises a history storage unit 305 for sequentially storing the state of each component and each operation by a user, and a history regenerate/display controller 306 for displaying, on the screen 302, any portion of the content of the history storage unit 305.

With the above described configuration, the history regenerate/display controller 306 reads, from the history storage unit 305, the history of the simulation at any point and displays it on the screen 302 in a window form, etc. Therefore, a user can obtain the state of a history immediately, thereby realizing a quick check of a service operation.

The third aspect of the present invention comprises a simulation process controller 308 for copying simulation processes 307, executing each of them independently, and displaying each of the components simulated by each of the simulation processes 307 on a separate screen area (window, etc.) corresponding to each of the simulation processes 307 on the screen 302 during the simulation of the communication service specification 301.

With the above described configuration, the simulation processes 307 are copied at any point during a simulation, and each of the simulation processes 307 can be executed separately using a screen such as separate windows on the screen 302. Therefore, even though there is a branch in the operation of the communication service specification 301, the simulation processes 307 can be copied at that point, thereby removing a trouble of repeating the operation of a service from the beginning to the branch and improving the efficiency of a simulating operation.

The fourth aspect of the present invention comprises a specified terminal identification information storage unit 309 for storing identification information of a user-specified terminal, and a sound output unit 310 for outputting a predetermined sound when the predetermined sound is outputted to a terminal specified by the identification information stored in the specified terminal identification information storage unit 309 during the simulation of the communication service specification 301.

With the above described configuration, since a reception bell, a connected sound, or an announcement can be outputted only to a terminal specified by a user, a terminal which receives sound output information can be easily determined, thereby improving the operability of a simulator.

The fifth aspect of the present invention comprises the sound output unit 310 for outputting a predetermined sound for a predetermined time synchronous with the change on the screen 302 of a terminal when the predetermined sound is outputted to the terminal during the simulation of the communication service specification 301.

With the above described configuration, when a state changes at any terminal and the screen 302 also changes together, a sound outputting operation is performed at the terminal for a predetermined time (for a short time, for example). Therefore, a user can hear the state change of the terminal, thereby allowing him to know the state change through a sound in addition to through the screen 302.

Figure 4:
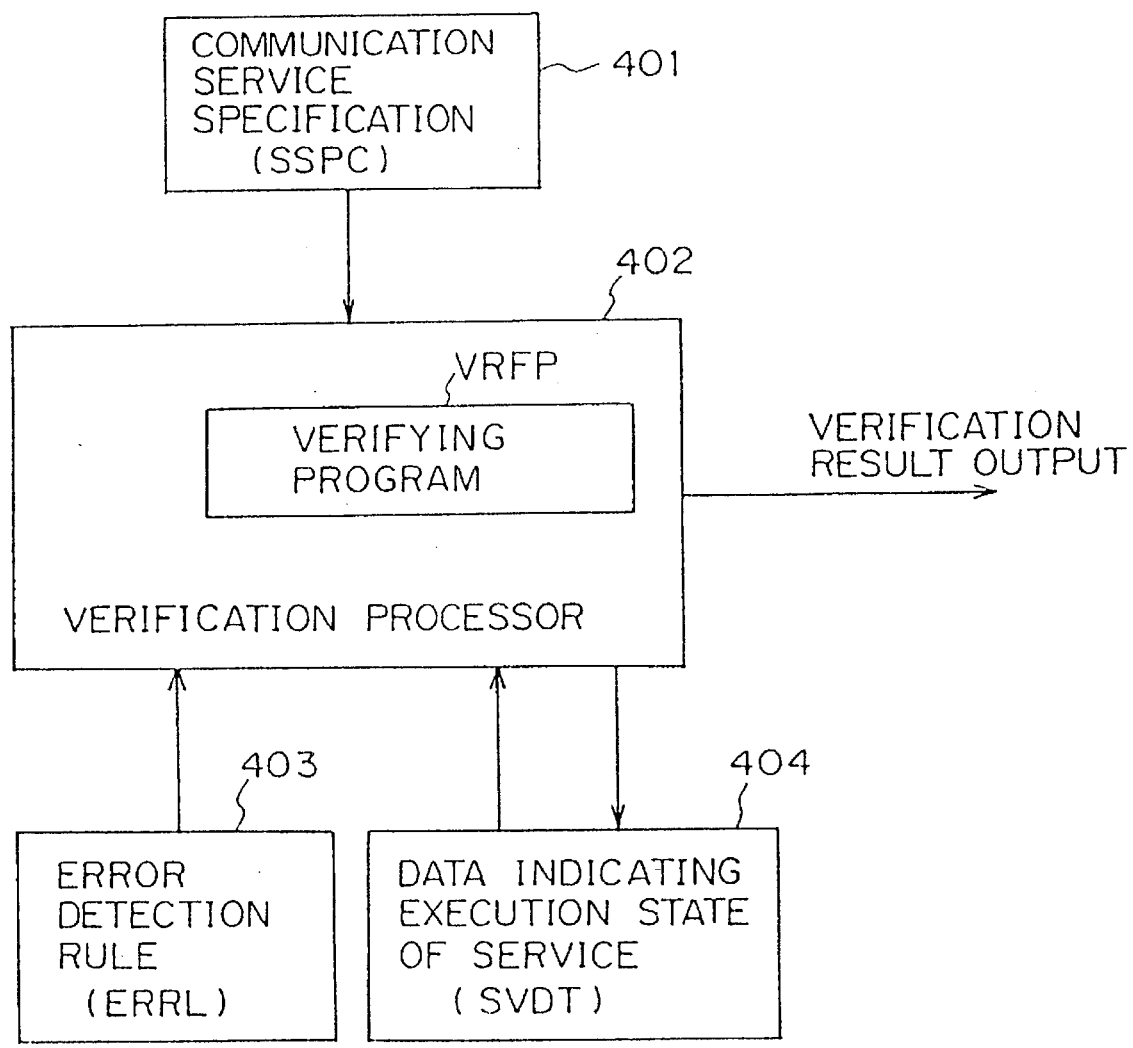
FIG. 4 is a block diagram for explaining the principle of the sixth through the ninth aspects of the present invention.

Explanation of the Principle of the sixth through the ninth aspects of the present invention FIG. 4 is a block diagram for explaining the principle of the sixth through ninth aspects of the present invention.

A communication service specification storage unit 401 stores a communication service specification SSPC. A verification processor 402 verifies the communication service specification SSPC according to a verifying program VRFP. A storage unit 403 stores an error detection rule ERRL. A service execution state storage unit 404 stores a data SVDT indicating the current execution state of a service.

In the sixth aspect of the present invention, a plurality of error detection rules ERRL are set to determine a communication service specification SSPC to be erroneous or valid according to the condition determined based on the data SVDT indicating the service execution state for each description element of a communication service specification SSPC. The determination results are stored in the error detection rule storage 403.

Then, in the verification of the communication service specification SPPC, the verification processor 402 reads, from the communication service specification storage unit 401, a description element of the communication service specification SSPC as a verification target according to the verifying program VRFP. It checks whether or not an error exists by comparing all error detection rules ERRL corresponding to the description element to be verified with the data SVDT indicating the current execution state of a service. If an error exits, it outputs an error detection result. If no error exists, it performs a simulation of a communication service according to the description element to be verified, rewrites the data SVDT indicating the current execution state of a service, and then reads the next description element of the communication service specification SSPC as a verification target to verify the communication service specification SSPC.

In this way, the communication service specification SSPC can be automatically verified, and can detect various types of errors by setting various error detection rules ERRL.

Verification can be performed using the content of the data SVDT and a description element to be verified by reflecting the results of the processes performed before processing the description element to be verified on the content of the data SVDT indicating the execution state of a service. Thus, it is not necessary to check, for each description element to be verified, the contents of the preceding processes, thereby reducing a processing cost.

Next, in the seventh aspect of the present invention, in addition to the configuration of the above described sixth aspect of the present invention, a service simulation rule is set for each description element of a communication service specification SSPC in order to determine the next execution state of a service on the condition of the data SVDT indicating the present execution state of the service. Then, in the verification of a communication service specification SPPC, the verification processor 402 obtains the data SVDT indicating the next execution state of a service by comparing each service simulation rule corresponding to a description element to be verified with the data SVDT indicating the current execution state of a service. Thus, a communication service can be easily simulated.

With the configuration of the above described sixth or seventh aspect, the eighth aspect of the present invention is further configured such that the error detection rule ERRL contains a value indicating the extent of an error or validity. As a result, an uncertain error verification rule for detecting a semantic error can be automatically described.

Furthermore, the ninth aspect of the present invention sets, using the data indicating the execution state SVDT of a service, one or more validity detection rules to detect the validity of a communication service specification SSPC for each description element, checks the validity by comparing the current execution state of a service SVDT with all validity detection rules corresponding to an element to be verified, and determines an error when the element to be verified meets none of the validity detection rules. Thus, the increasing number of error detection rules for detecting an error in a communication service specification SSPC can be reduced by adopting a validity detection rule instead of error detection rules, thereby detecting an error at a high speed.

1st Embodiment

<Hardware Configuration>

Figure 5:
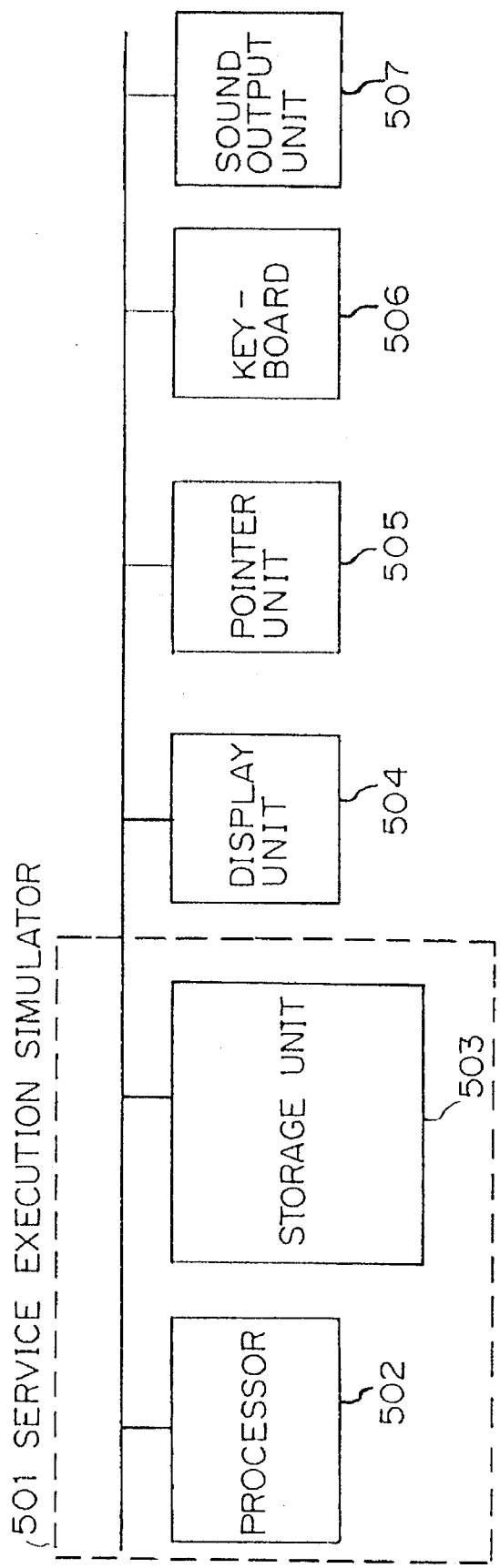
FIG. 5 shows the configuration of the hardware of the first embodiment.

FIG. 5 shows the hardware configuration of the first embodiment corresponding to the first through the fifth aspects of the present invention.

The embodiment comprises a service execution simulator 501 comprising a processor 502 such as a microprocessor, etc. and a storage unit 503 for storing various programs and data, etc., and a display (graphic display) unit 504, a pointer unit 505 such as a mouse, etc., a keyboard 506, and a sound output unit 507, each connected to the simulator through a bus.

<Functional Configuration>

Figure 6:
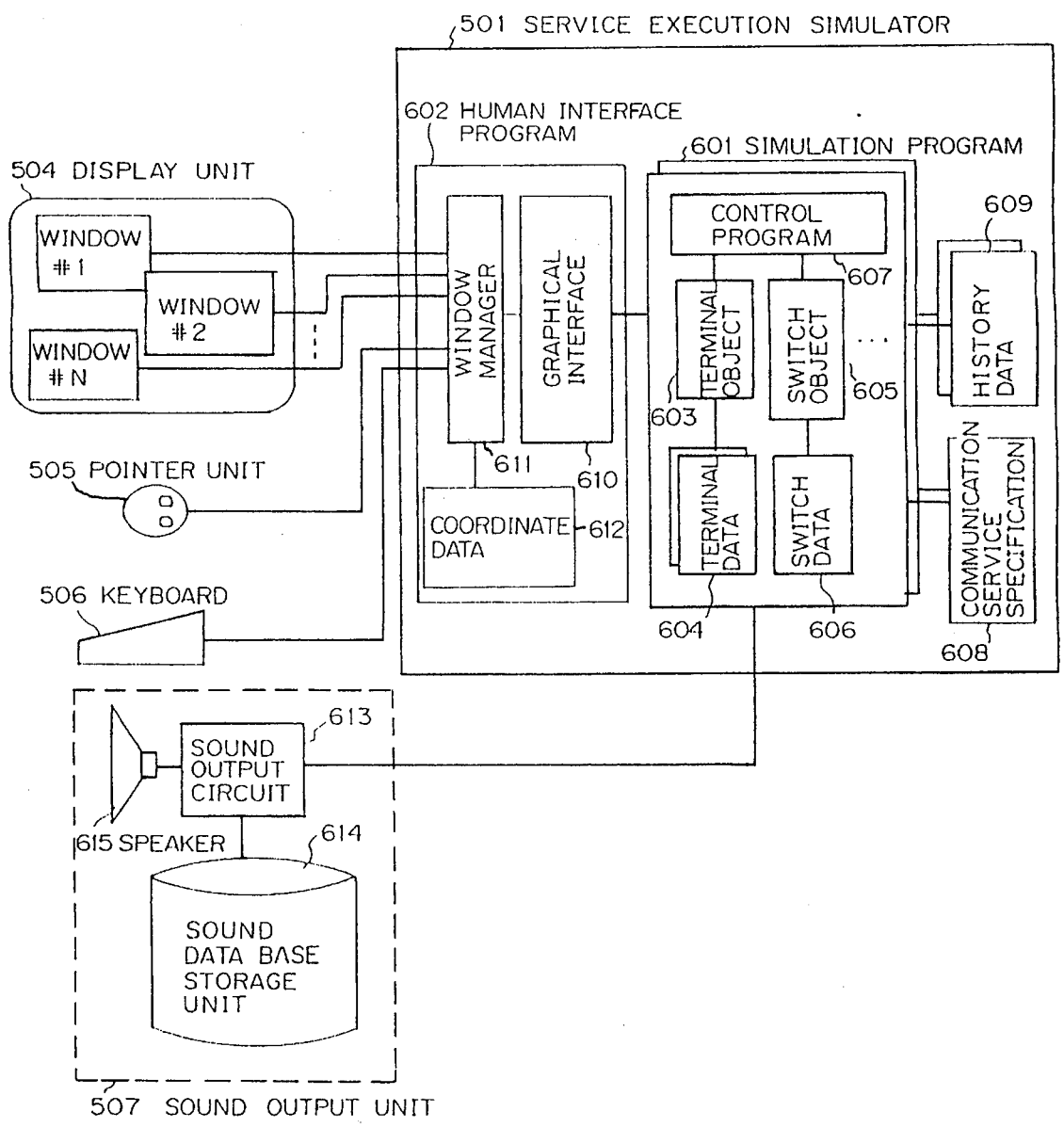
FIG. 6 shows the functional configuration for explaining the first embodiment.

FIG. 6 shows the functional configuration for explaining the hardware configuration of the first embodiment shown in FIG. 5 from the viewpoint of functions.

The service execution simulator 501 executes a simulation program 601 and a human interface program 602.

The simulation program 601 is operated according to a user-defined communication service specification 608, and comprises a control program 607, a terminal object 603, terminal data 604, a switch object 605, and switch data 606.

The control program 607 receives a user input through the human interface program 602 and sends the terminal object 603 or the switch object 605 a necessary message for each object, for example, an instruction of an off-hook, an on-hook, a reset of a hooking or a system, etc.

On receiving a message from the control program 607, the terminal object 603 processes the terminal data 604 to simulate the terminal operation of subscriber terminals, etc.

On receiving a message from the control program 607, the switch object 605 processes switch data 606 according to the content of the communication service specification 608 to simulate the switch operation of switches, etc. of a switching unit, and sends a message to the terminal object 603 to control the operation of terminals.

The operation result of the terminal object 603 or the switch object 605 is sent to the human interface program 602 through the control program 607 and displayed on the display unit 504 through the program 602. The above described operation result is sent to the sound output unit 507 through the control program 607 and vocally outputted by the sound output unit 507.

The control program 607 controls the transmission of a message between the terminal object 603 and the switch object 605, and sequentially stores each operation in the simulation program 601 as history data.

The human interface program 602 comprises a graphical interface 610, a window manager 611, coordinate data 612, etc.

The window manager 611 controls the operation state and the display state of windows (#1–#N) on the display unit 504 according to the coordinate data 612, and obtains from a user the state of the pointer unit 505 or the keyboard 506.

The graphical interface 610 converts the data from the simulation program 601 to graphic data and outputs them to the window manager 611, and outputs the operation information about the pointer unit 505 or the keyboard 506 received from the window manager 611 to the simulation program 601.

As shown in FIG. 6, the sound output unit 507 shown in FIG. 5 comprises a sound data base storage unit 614 for storing sound data, a sound output circuit 613 for reading, from the sound data base storage unit 614, the sound data specified by the instruction of the simulation program 601 and outputting the sound, and a speaker 615 for vocally generating the sound according to the outputted sound data.

The operation of the first embodiment having the configuration shown in FIGS. 5 and 6 is sequentially explained below.

<Generating Terminal Data>

If a terminal receives a call through the switch object 605 during a simulation, the switch object 605 reserves a logical terminal position in a window screen on the display unit 504, and sends a reception message including the position information and the dial number to the terminal object 603.

The terminal object 603 checks the terminal data 604, and if the terminal having the dial number is not registered, the terminal data 604 is assigned a new terminal data area and is written therein the dial number and the state "being called".

Figure 7:
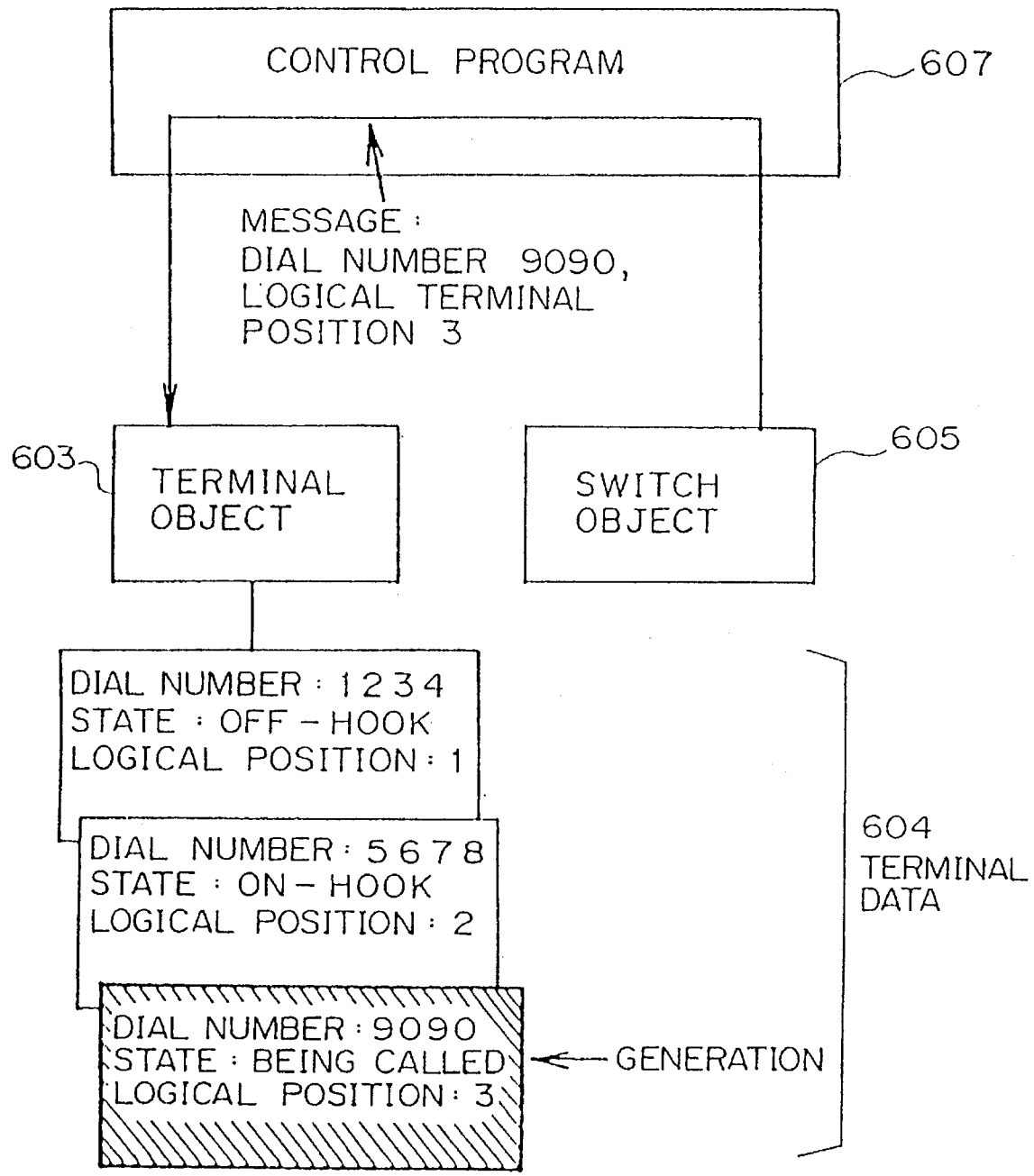
FIG. 7 shows the operation of generating terminal data in the first embodiment.

The above described operation is illustrated in FIG. 7.

The terminal object 603 writes, in the above described area, a logical terminal position on a screen, and graphically displays a terminal being called on the screen through the human interface program 602.

Thus, even though an unregistered terminal receives a call, the terminal is automatically registered and displayed on the screen.

<Storing and Displaying History Data>

Figure 8:
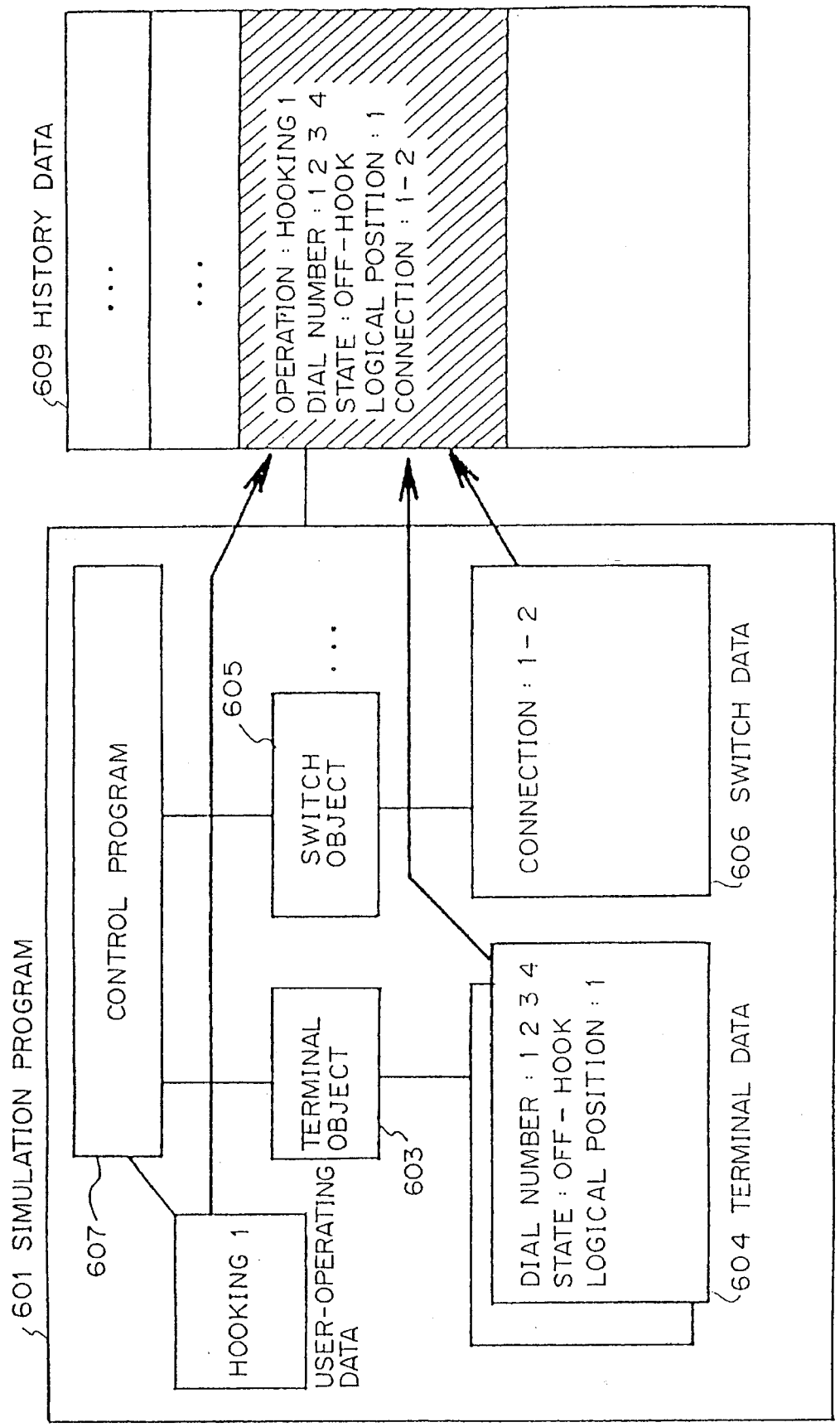
FIG. 8 shows the operation of storing history data in the first embodiment.

After a simulating operation is started by a user operation (off-hook, hooking, etc.) inputted through the pointer unit 505 or the keyboard 506, the control program 607 collects the switch data 606 or the terminal data 604 about the terminal object 603 and the switch object 605 when a message communication is completed between objects each corresponding to an appliance and unit, that is, when the simulation program 601 turns to the waiting-for-an-input state to wait for user-inputted operation data. Then, the control program 607 stores them as the history data 609 together with user operated data as shown in FIG. 8.

Figure 9:
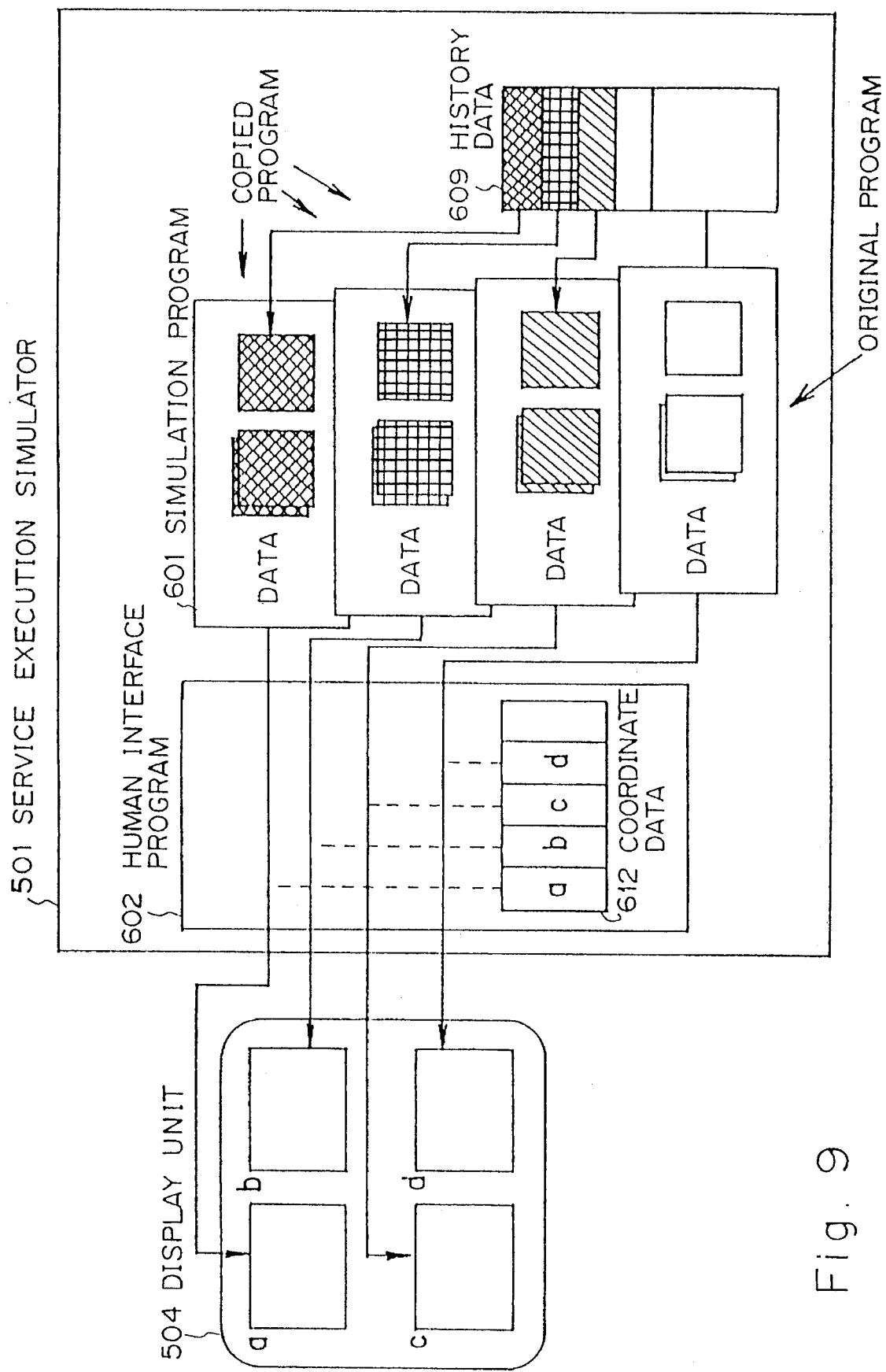
FIG. 9 shows the operation of displaying a history in the first embodiment.

When a user specifies "display a history" through the keyboard 506, etc., the control program 607 reads data at each point from the history data 609, and copies the simulation program 601 corresponding to each data as shown in FIG. 9. Each of the copied programs defines for the human interface program 602 the coordinate data 612 as a, b, c, and d, as shown in FIG. 9, each forming the screen on the display unit 504, and sends the state of each object and the user operation, that is, the history data 609, to the human interface program 602. Thus, the program outputs the state corresponding to the data in each window on the screen according to each of the coordinate data 612.

Thus, the history of a simulation can be divisionally displayed on the screen. The state description format in the history data 609 is not limited to the text format shown in FIG. 8, but can be represented in a graphical format.

<Branch Controlling Operation>

Figure 10:
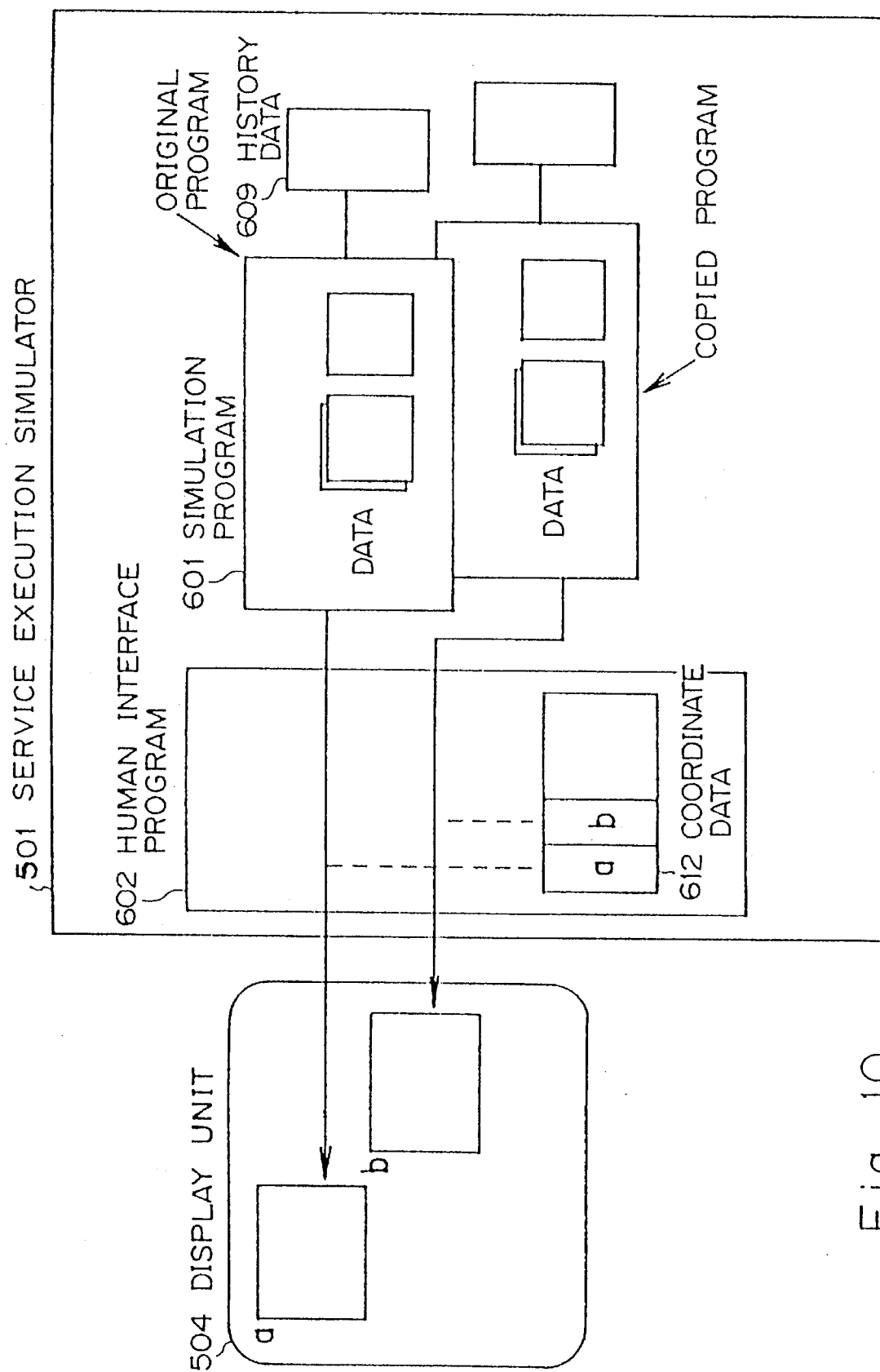
FIG. 10 shows the branch controlling operation in the first embodiment.

On receiving a "branch" instruction from a user through the keyboard 506, etc. at a certain point during a simulating operation, the control program 607 generates a plurality of simulation programs as shown in FIG. 10. A copied simulation program 601 defines, for the human interface program 602, the coordinate data 612 corresponding to a screen b different from a screen a of the original program on the screen of the display unit 504. Afterwards, each of the simulation programs 601 is executed independently.

Thus, a simulation can be branched and executed in parallel even though the operation of a service has a branch.

<Sound Output from a specified terminal>

On receiving a "specify a terminal" instruction from a user through the keyboard 506, etc. at a certain point during a simulating operation, the control program 607 sends the logical position number of the specified terminal to the terminal object 603 and the switch object 605. Thus, the terminal object 603 sets the flag for the specified terminal in the terminal data 604 to "ON", and the switch object 605 writes to the switch data 606 the logical position number of the above described specified terminal.

Figure 11:
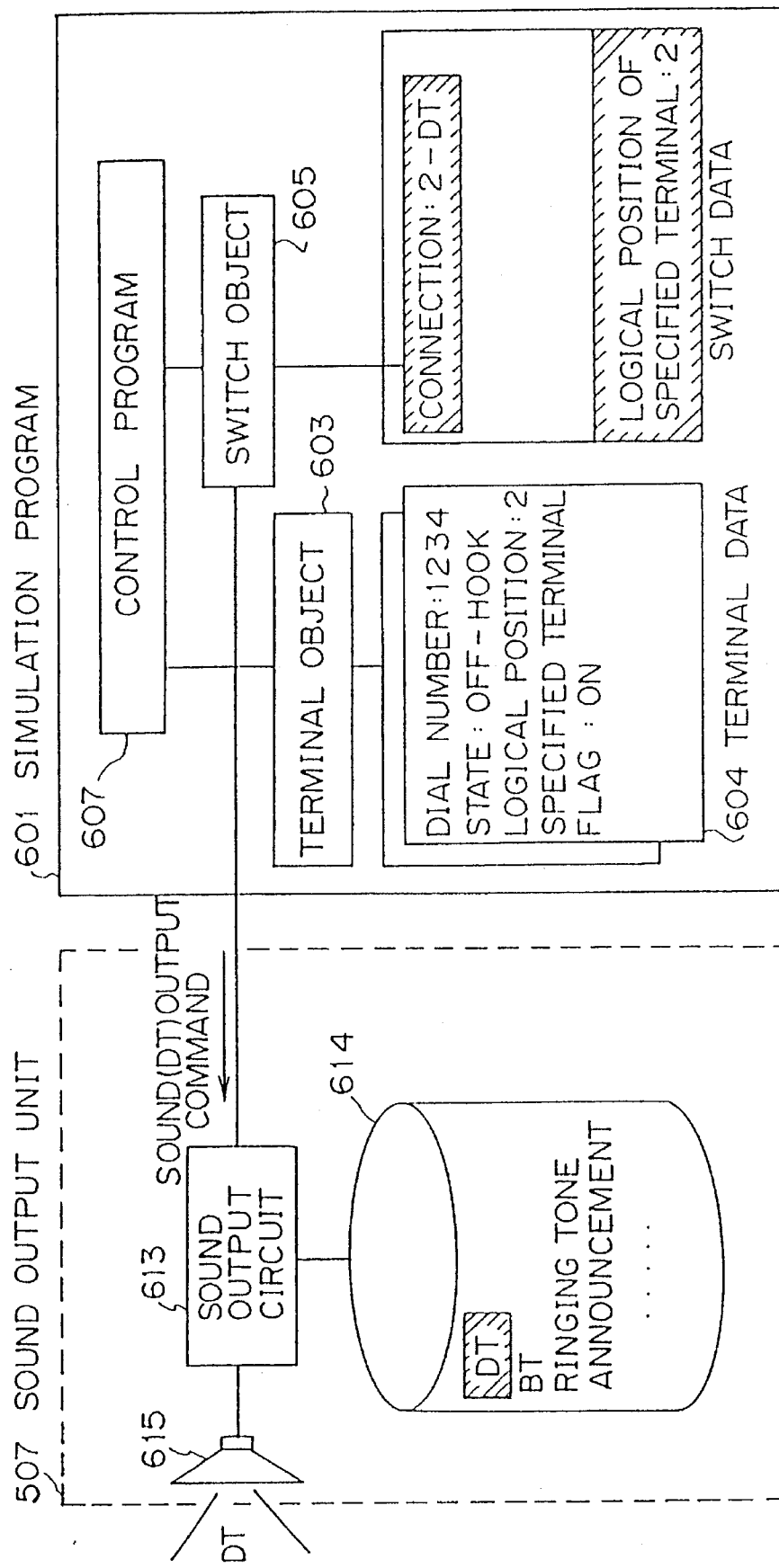
FIG. 11 shows the operation of outputting a sound in the first embodiment.

Afterwards, when any connection of the switch data 606 is changed, the switch object 605 checks whether or not the connection is made between the specified terminal stored as the switch data 606 and the sounding or announcing unit (trunk unit DT). If a connection is made, a sound or an announcement output command for the specified terminal is sent to the sound output unit 507 as shown in FIG. 11. Thus, the sound output circuit 613 reads, from the sound data base storage unit 614, the sound data specified by the above described command, and starts generating a sound or an announcement according to the sound data through the speaker 615.

If a connection of a terminal is changed, the switch object 605 sends, to the sound output unit 507, a command to stop the output of a sound. Then, the sound output circuit 613 immediately stops the output of the above described sound.

Likewise, if the state of any terminal data 604 is changed during a call, the terminal object 603 checks whether or not the flag of the specified terminal is set to "ON". If the flag is set to "ON", the terminal object 603 sends a ringing tone output command to the sound output unit 507. Thus, the sound output unit 507 starts outputting a ringing tone according to the corresponding sound data.

Through all the above described processes, a bell tone or a tone or an announcement which indicates that the line is engaged, can be outputted to a terminal specified by a user.

<Outputting a sound as interlocked with the change of a screen>

If a connection in any switch data 606 is changed and a terminal is connected to a tone or an announcement output unit (trunk unit) during a simulating operation, the switch object 605 outputs data in a window on the screen of the display unit 504 through the human interface program 602, sends to the sound output unit 507 a command to output a corresponding tone or announcement, and sends a stop command after a moment. Thus, the sound output circuit 613 reads from the sound data base storage unit 614 the specified sound data according to the above described command, and generates, through the speaker 615, a tone or an announcement for a moment according to the sound data.

Likewise, if the state of any terminal data 604 is changed during a call, the terminal object 603 outputs data in a window on the screen of the display unit 504 through the human interface program 602, sends a calling sound output command to the sound output unit 507, and sends a stop command after a moment. Thus, the sound output circuit 613 reads the specified data from the sound data base storage unit 614 according to the above described command, and generates a calling sound through the speaker 615 for a moment according to the sound data.

Through the above described processes, a corresponding sound is outputted for a moment in synchronism with the change of the state of a communication network displayed on the screen.

2nd Embodiment

<Hardware Configuration>

Figure 12:
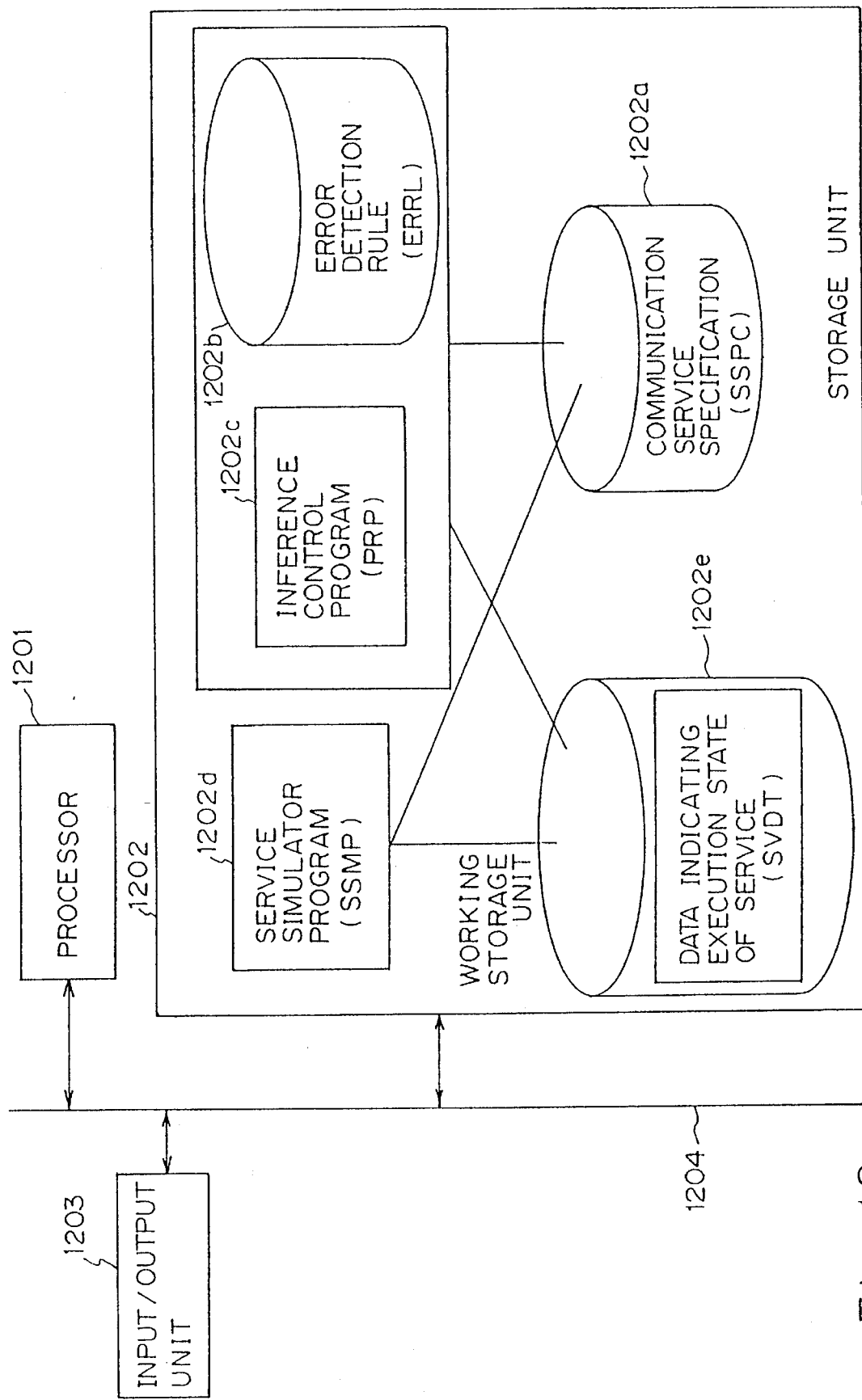
FIG. 12 shows the configuration of the hardware in the second embodiment.

FIG. 12 shows the hardware configuration of the second embodiment corresponding to the sixth through the ninth aspects of the present invention.

A processor 1201 controls the operation of the whole system. A storage unit 1202 stores various programs, rules, and other data. An input/output unit 1203 comprises a keyboard for allowing a user to input various instruction data, a display for displaying a verification result, etc. The processor 1201, the storage unit 1202, and the input/output unit 1203 are connected through a bus 1204.

The storage unit 1202 comprises a RAM, a ROM, storage media such as hard disks, etc. and stores a predetermined program, rule, and data in each of the storage media.

A communication service specification storage unit 1202a stores a communication service specification SSPC.

An error detection rule storage unit 1202b stores an error detection rule ERRL described according to a production rule written in the "IF-THEN-" format.

A storage unit 1202c stores an inference/control program IRP for inferring an error in a description element to be verified.

A storage unit 1202d stores a service simulator program SSMP for simulating a communication service specification.

A working storage unit 1202e stores the data SVDT for indicating the execution state of a service.

The service simulator program SSMP refers to a communication service specification SSPC and the data SVDT indicating the execution state of a service, simulates the operation of each description element of a communication service specification SSPC, and writes in the working storage unit 1202e the result as the data SVDT indicating the execution state of a service.

The inference/control program IRP performs a verification process by applying the error detection rule ERRL to the data SVDT indicating the execution state of a service and to a description element of a communication service specification SSPC, and outputs, to the input/output unit 1203, an error in the specification if any exists.

The service simulator program SSMP and the inference control program IRP are operated alternately to sequentially proceed with the verification of description elements of the communication service specification SSPC.

<Software Configuration>

FIG. 6 shows the functional configuration by illustrating the hardware configuration of the first embodiment shown in FIG. 5 from the viewpoint of functions.

Figure 13:
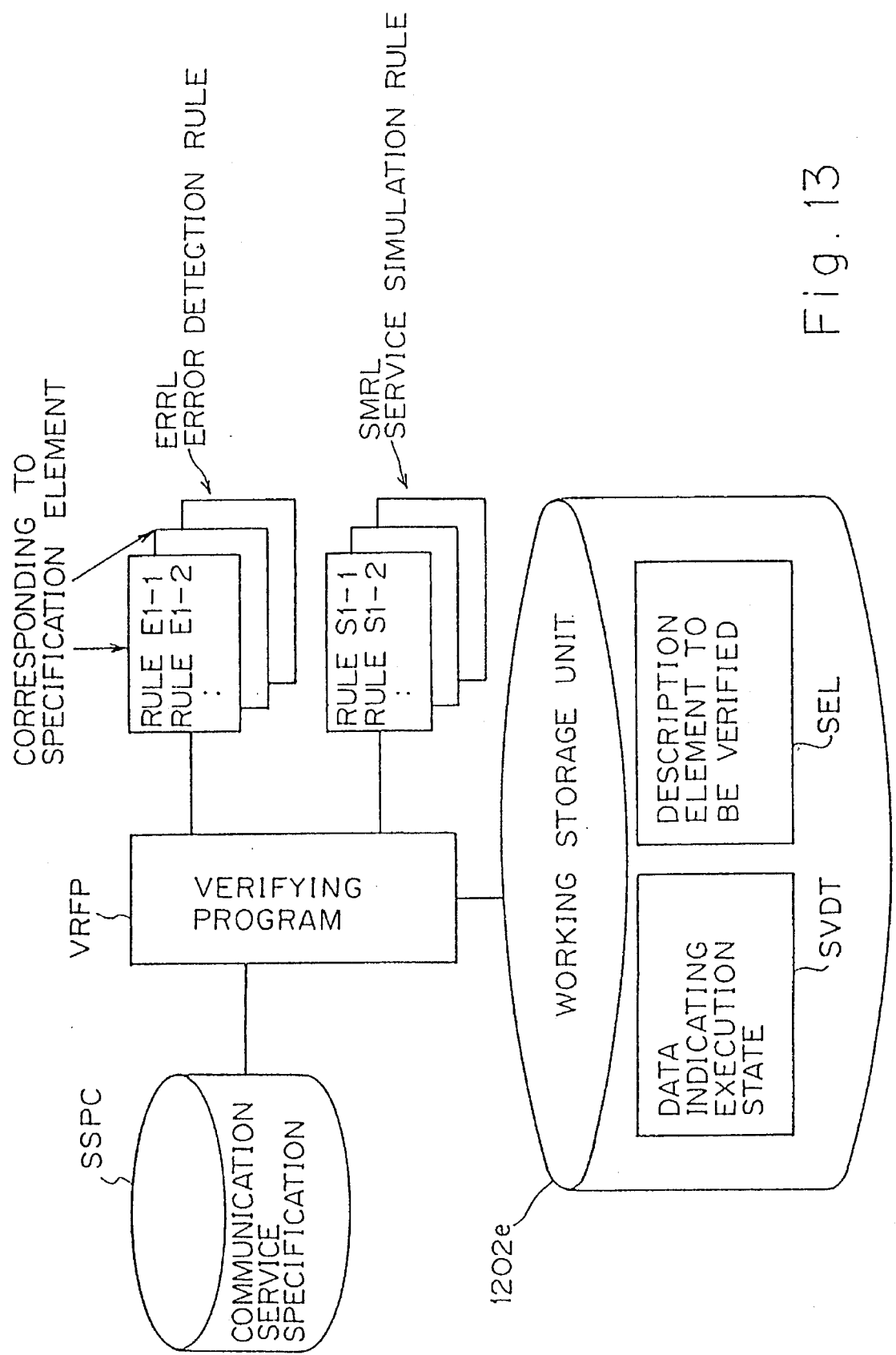
FIG. 13 shows the configuration of the software in the second embodiment.

FIG. 13 shows the software configuration by illustrating from the viewpoint of functions the software configuration for the processes performed by the hardware configuration of the second embodiment shown in FIG. 12. The units also shown in FIG. 12 are assigned the same identification number.

A communication service specification SSPC can be decomposed into a plurality of elements of a series of communication service operations, and each of its elements can be written in a formal language.

The error detection rules ERRL for detecting an error in a communication service specification SSPC are written as a production rule in the "IF-THEN-" format. Each of these error detection rules ERRL is set for each description element forming a communication service specification SSPC. Each of the error detection rules E1-1, E1-2, . . . is described such that an error or a validity of a communication service specification SSPC can be inferred using a description element of a communication service specification SSPC and the data SVDT indicating the execution state of a service, each of the description elements corresponding to one or more error detection rules ERRL.

The service simulation rule SMRL indicates the operational rules of a communication service described according to a production rule written in the "IF-THEN-" format. These service simulation rules SMRL are set for each of the description elements forming the communication service specification SSPC. Each of the service simulation rules S1-1, S1-2, . . . is described such that the data SVDT indicating the next execution state of a service can be inferred using a description element of the communication service specification SSPC and the data SVDT indicating the current execution state of a service. One description element corresponds to one or more service simulation rules SMRL.

The verifying program VRFP is obtained by combining the service simulator program SSMP and the inference/control program IRP shown in FIG. 12. During a simulation, the program VRFP performs a service simulation according to the description elements of the communication service specification SSPC using service simulation rules SMRL, and rewrites the data SVDT indicating the execution state of a service. During a verification process, the above described program VRFP detects an error in the communication service specification SSPC using error detection rules ERRL according to the data SVDT indicating the execution state of a service and description elements of the communication service specification SSPC.

The working storage unit 1202e stores the data SVDT indicating the execution state of a service and description elements SEL to be verified, etc.

Figure 14:
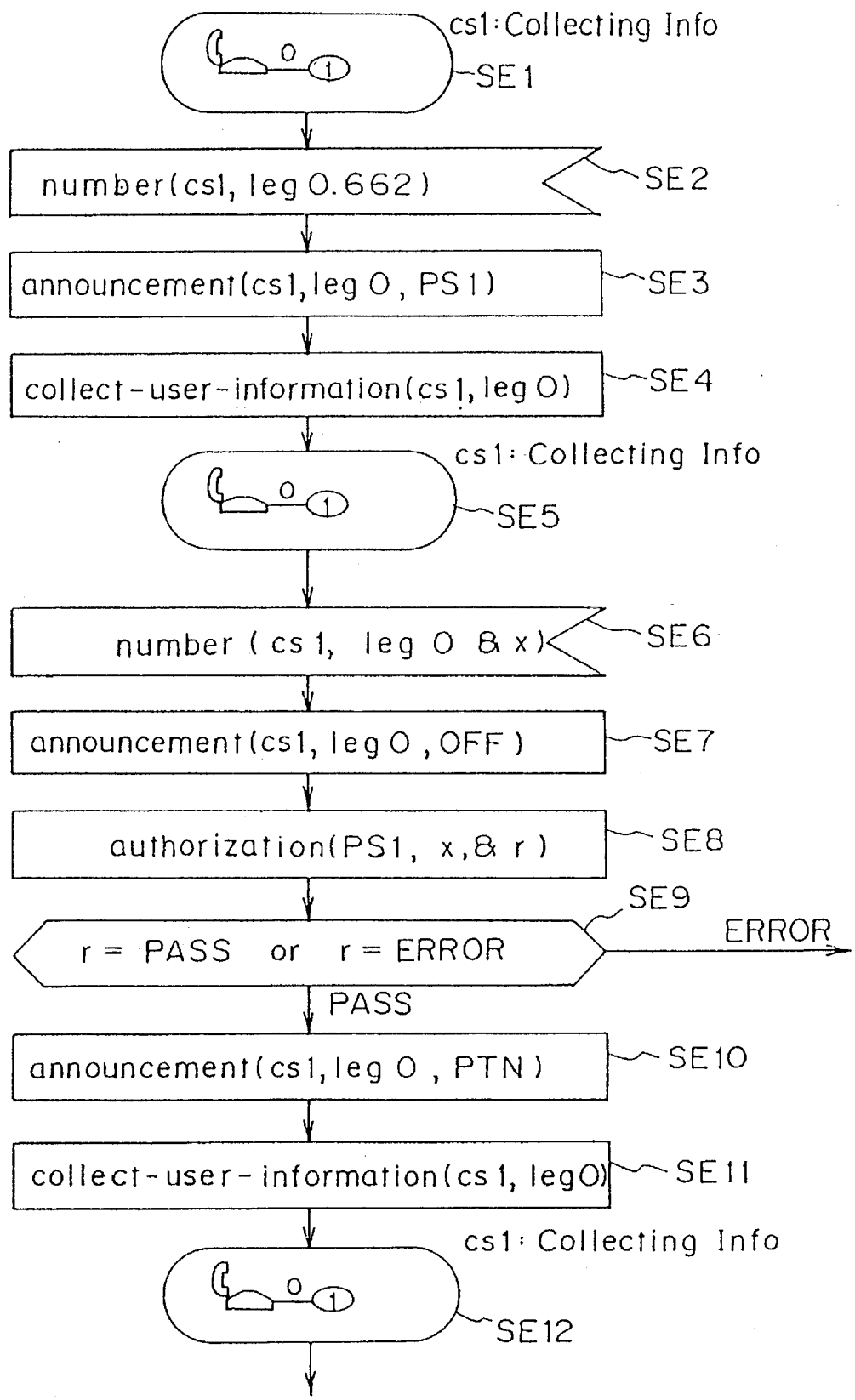
FIG. 14 is a view for explaining a practical example of a communication service specification of the second embodiment.

FIG. 14 shows a practical example of a communication service specification SSPC, and a part of a UPT (Universal Personal Telecommunication) service. A UPT service performs a function of making a call using a number (personal number) assigned to each user. With this service, dialing "662", the specific number indicating the UPT service, causes a service program to instruct a caller to input his own personal number, and then checks the validity of the inputted personal number, and, if it is valid, establishes a communication line by converting the personal number to the telephone number of the receiver.

In the example of a UPT service shown in FIG. 14, the specification starts at the state "off-hook" (the state at which a phone is taken off the hook), and comprises such description elements as states, events, operations, determinations, etc. In FIG. 14, an oval frame indicates a state, a rectangular frame indicates an operation; a concaved-right-end frame indicates an event; and a triangular-end frame indicates a determination. "cs1" means the connection segment 1; "leg0" means the connection path between switch and telephone terminal 0. In FIG. 14, the following description elements of the communication service specification SE1–SE12 are described, and stored in the communication service specification storage 1202a.

SE1: an input-of-number waiting state

SE2: an event indicating that a special number "662" is dialed

SE3: an operation of announcing a PSI (a message prompting a dial input of a personal accounting number PSI)

SE4: an operation of reading an inputted PSI (number)

SE5: a number waiting state

SE6: an event indicating "&x" is dialed

SE7: an operation of turning off an announcement

SE8: an operation of checking whether or not the received number "&x" is valid as a PSI, and returning the result as r (valid: r=PASS, invalid: r=ERROR)

SE9: determination as r=PASS or r=ERROR

SE10: an operation of announcing a PTN (a message prompting a personal number PTN be dialed)

SE11: an operation of reading an inputted PTN (a personal number)

| SE12: an input-of-number waiting state | |
| --- | --- |
| cs1:Collecting Info | SE1 |
| number(cs1,leg0.662) | SE2 |
| announcement(cs1,leg0,PSI) | SE3 |
| collect-user-information(cs1,leg0) | SE4 |
| cs1:Collecting Info | SE5 |
| number(cs1,leg0,&x) | SE6 |
| announcement(cs1,leg0,Off) | SE7 |
| authorization(PSI,x,&r) | SE8 |
| r = PASS(or R = ERROR) | SE9 |
| announcement(cs1,leg0,PIN) | SE10 |
| collect-user-information(cs1,leg0) | SE11 |
| cs1:Collecting Info | SE12 |

FIGS. 15A and 15B show an example of a service simulation rule SMRL.

FIG. 15A shows a service simulation rule SMRL when a description element indicates a state "cs1:Collecting Info". When the above described description element is read, the rule sets the state data for the data SVDT indicating the execution state of a service to "cs1:Collecting Info" whatever state the current execution state of a service is.

FIG. 15B shows a service simulation rule SMRL when a description element indicates "an event:number(cs1,leg0, &x)". When the above described description element is read, the rule sets the "input data" in the data SVDT indicating the next execution state of a service to "a PSI input accepted" and the "variable x" is set to the inputted value if the current execution state of a service is "cs1:Collecting Info" and "announcement=PSI". The number of service simulation rules SMRL is not limited to 1 when a description element indicates "event:number(cs1,leg0,&x)". For example, the following rule is set when the above described description element exists.

If the state is cs1:Collecting Info and the announcement is PTN,
then, the input is PTN and x=input number.

The service simulation rule SMRL sets the "input data" in the data SVDT indicating the next execution state of a service to "PSI input accepted" and sets the "variable x" to the inputted value if the current execution state of a service is "cs1:Collecting Info" and "announcement=PTN" when a description element "event:number(cs1,leg0,&*)" is read.

FIGS. 16A–16D shows an example of an error detection rule ERRL. The error detection rule ERRL consists of a rule for inferring an error and a rule for inferring validity.

FIG. 16A shows an error detection rule ERRL when a description element is an "event:off-hook(cs1,leg0)" This rule recognized an error if the current execution state of a service is "cs1:Collecting Info" when the above described description element is read. That is, defining a description element as an instruction for "off-hook" is an error when a hook is taken off and waiting for an input of a number. If a description element is an "event:off-hook(cs1,leg0)", the number of error detection rules ERRL is not limited to 1.

FIG. 16B shows an error detection rule ERRL when a description element is a "determination." In the description element SE9 of the communication service specification shown in FIG. 14, a description element is an error if the current execution state of a service is "PSI authorization" and r is not PASS nor ERROR. The error detection rule ERRL can be described by the following two rules for inferring validity.

If the state is PSI authorization and r=PASS,
then the element is valid.
If the state is PSI authorization and r=ERROR,
then the element is valid.

FIG. 16C shows an error detection rule ERRL when a description element is an "operation:announcement(cs1, leg0,PSI)". The rule indicates an error if the data indicating the current execution state of a service are "input=PSI input accepted" when the above described description element is read. That is, a message cannot announce a prompt for an input of a personal accounting number PSI which is already inputted. However, in some operations requiring an input twice, the possibility of an error or validity can be represented by 0.5 by describing "an error (redundant input? 0.5)". That is, the extent of an error or validity can be represented by a step value or a series of values.

FIG. 17 shows an example of the data SVDT indicating an execution state of a service. The data SVDT, indicating an execution state of a service, includes "state data", "connection data", "variable data", "input data", etc., and retains the process results of a service executed before executing the description elements to be verified.

FIG. 17 shows the data SVDT indicating the execution state of a service when the description element SSE12 shown in FIG. 14 is read. That is, the current state is a PTN number waiting state "cs1:Collecting Info", the telephone terminal and the announcement (PTN) are connected to each other, the variable x=000 (personal accounting number PSI), r=PASS, and the personal accounting number PSI is already inputted.

<Error Verification Process)

Figure 18:
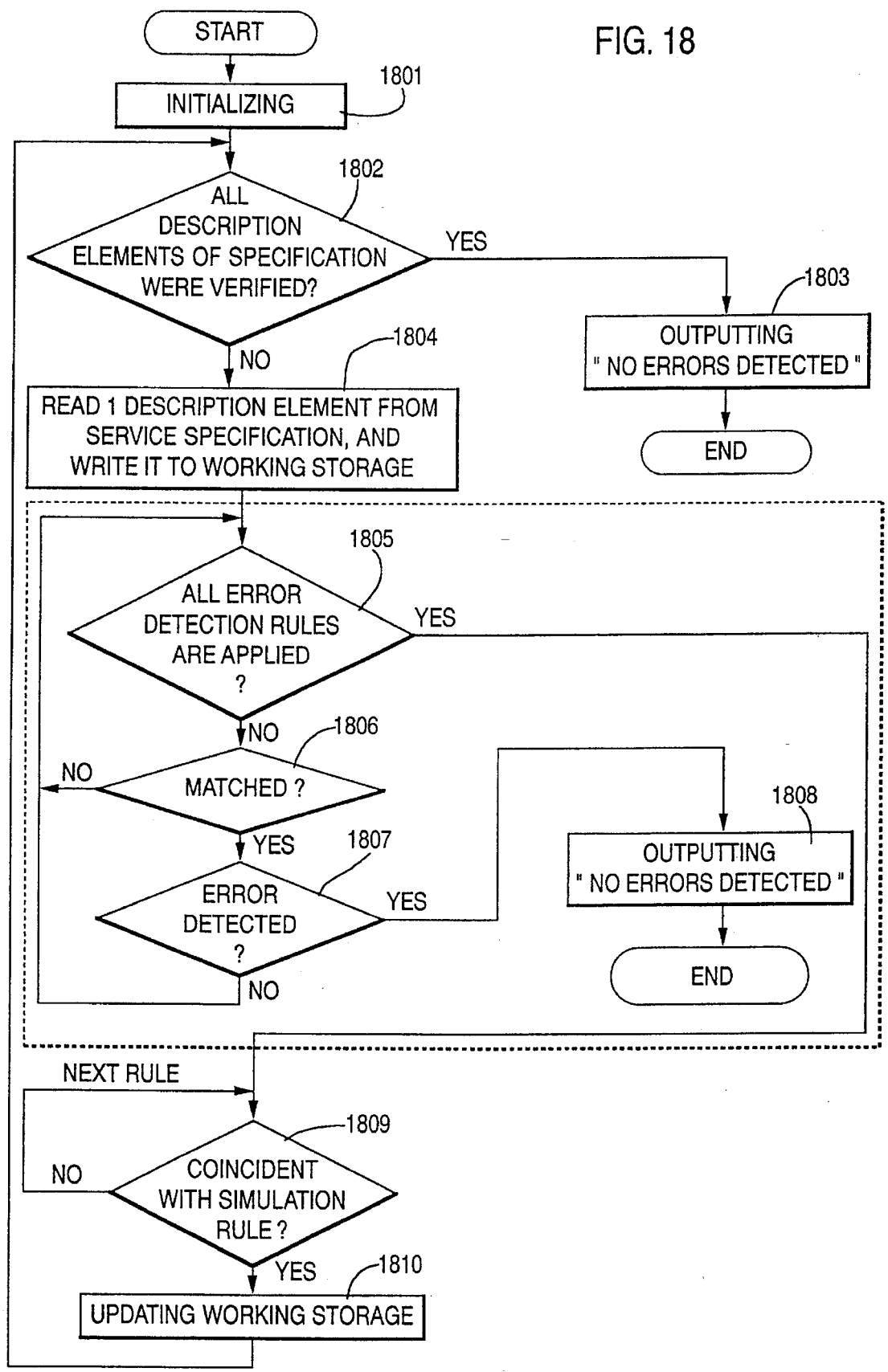
FIG. 18 is an operational flowchart for explaining a verification process in the second embodiment.

FIG. 18 is an operational flowchart of the verifying program shown in FIG. 13.

In a verification process, the content of the working storage unit 1202e is initialized (step 1801).

Then, determination is made as to whether or not the verification process is performed on all the description elements of a communication service specification SSPC (step 1802). If it is, the verification result "no errors detected" is outputted to the input/output unit 1203 (refer to FIG. 12)(step 1803) and the verification process is terminated.

However, if the verification process is not performed on all the description elements, new description elements forming the communication service specification are read and written to the working storage unit 1202e as description elements SEL to be verified (step 1804).

Then, determination is made as to whether or not all the error detection rules ERRL set for the above described description element SEL to be verified are referred to (step 1805).

If all the error detection rules ERRL are not referred to, one of the remaining error detection rules ERRL is read, and determination is made as to whether or not the data SVDT indicating the current execution state of a service meets the error detection rule ERRL (step 1806). If they don't coincide, control is returned to step 1805. If they coincide, determination is made as to whether or not an "error" is described after "then" in the above described error detection rule ERRL (step 1807).

If an "error" is described after "then" in the above described error detection rule ERRL, the detection result "an error detected" is outputted to the input/output unit 1203 (1808), and the verification process is terminated.

If an "error" is not described after "then" in the above described error detection rule ERRL, that is, if "valid" is described, control is returned to step 1805.

If the processes in steps 1805–1808 are repeated and all the error detection rules ERRL are referred to without an error result, then the determination in step 1805 indicates YES, and control is proceeded to step 1809.

In step 1809, service simulation rules SMRL set for a description element SEL to be verified are sequentially read, and determination is made as to whether or not the data SVDT indicating the current execution state of a service coincides with each of the rules. It is assumed that at least one service simulation rule SMRL exists to coincide with a description element to be verified.

If a simulation rule SMRL coincides with the element to be verified, the content of the data SVDT indicating the execution state of a service is rewritten according to the description after "then" in the above described rule SMRL (step 1810)(refer to FIG. 15), and control is returned to step 1802 to repeat the subsequent processes.

If the detection result "an error is detected" is outputted to the input/output unit 1203 (step 1808), the user must correct the error and resume the verification process from the beginning.

Described above is the operation performed when a verification process is performed according to an error detection rule ERRL comprising a rule for inferring an error in a communication service specification and a rule for inferring validity. For example, the verification process can be performed only by the rule for inferring validity in a communication service specification shown in FIG. 16D and hereinafter referred to as a validity detection rule.

Figure 19:
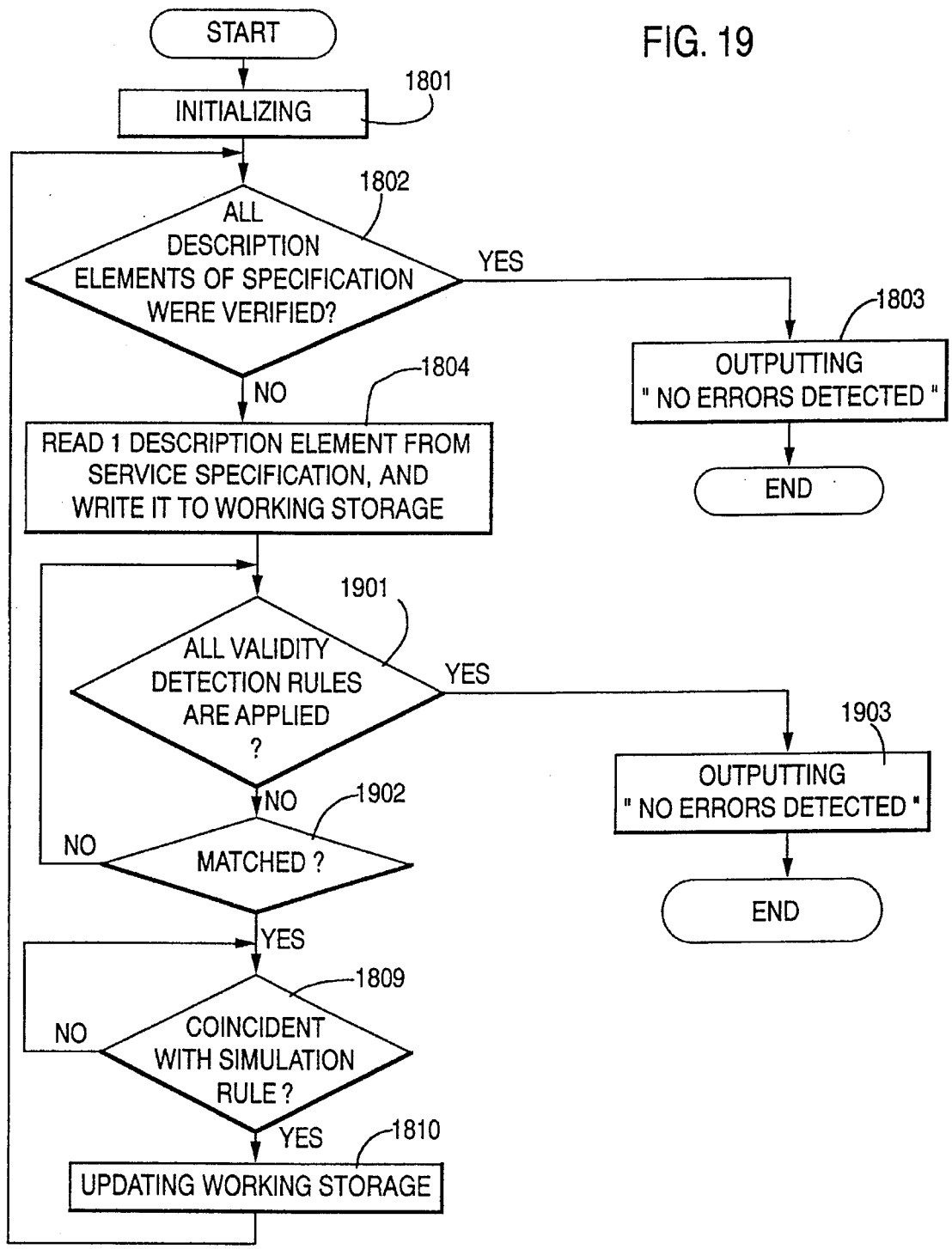
FIG. 19 is an operational flowchart for explaining another verification process in the second embodiment.

FIG. 19 is a flowchart for explaining the operation of the verifying program VRFP (refer to FIG. 13) when it performs a verification process only according to the validity detection rule. Since the processes in steps 1801–1804, 1809, and 1810 are the same as those shown in FIG. 18, the explanation is omitted here.

When a description element in a communication service specification SSPC is written in the working storage unit 1202e as a description element SEL to be verified, determination is made as to whether or not all the validity detection rules set for the description element SEL are referred to (step 1901).

If it is not, one of the remaining validity detection rules is read, and a determination is made as to whether or not the data SVDT indicating the current execution state of a service coincide with the validity detection rule (step 1902). If they do not coincide, control is returned to step 1901.

If the above described processes are repeated and no validity detection rules coincide with the element, then the determination in step 1901 indicates YES, and the verification result "an error is detected" is outputted to the input/output unit 1203 (refer to FIG. 12)(step 1903). Thus, the verification process is terminated.

If any validity detection rule coincides with the data SVDT indicating the current execution state of a service in the above described processes, then the determination in step 1902 indicates YES, and the content of the data SVDT indicating the execution state of a service is rewritten in step 1810. Then, control is returned to step 1802 to repeat the subsequent processes.

Figure 20:
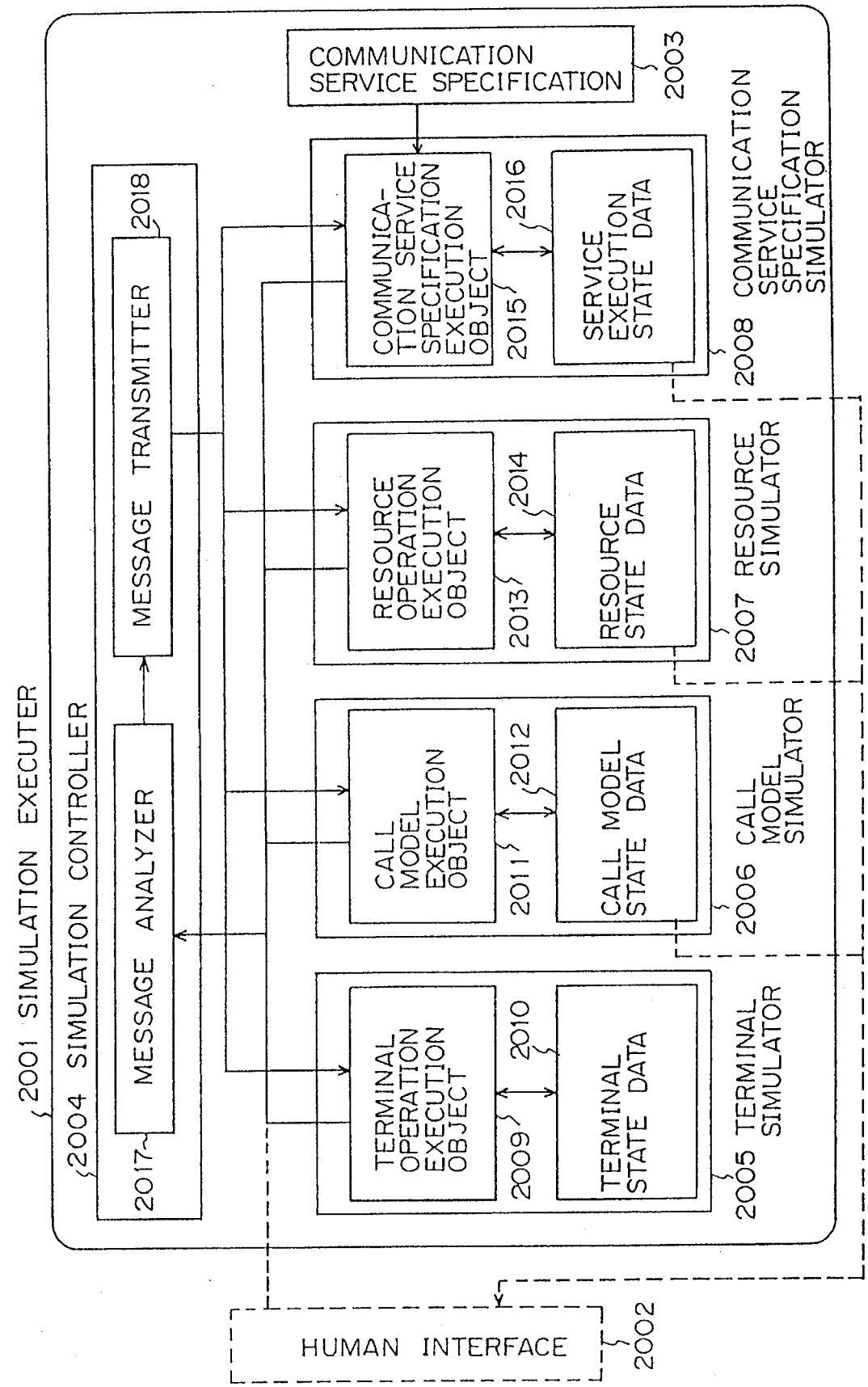
FIG. 20 shows the configuration of the third embodiment of the present invention.

FIG. 20 shows the configuration of the third embodiment.

A simulation executer 2001 executes a simulation of a service specification in an interaction mode with a user using a human interface 2002.

The simulation executer 2001 is operated based on a user-defined communication service specification 2003, and comprises a simulation controller 2004, a terminal simulator 2005, a call model simulator 2006, a resource simulator 2007, and a communication service specification simulator 2008.

The simulation controller 2004 comprises a message analyzer 2017 and a message transmitter 2018.

The message analyzer 2017 receives a message from a user through the human interface 2002 and analyzes it, and also receives a message from a terminal operation execution object 2009, a call model execution object 2011, a resource operation execution object 2013, or a communication service specification execution object 2015, and then analyzes it.

The message transmitter 2018 provides a message for a user as an image output or a voice output through the human interface 2002 according to the message analysis result obtained by the message analyzer 2017, and transmits a message to the terminal operation execution object 2009, the call model execution object 2011, the resource operation execution object 2013, and the communication service specification execution object 2015.

The terminal simulator 2005 comprises the terminal operation execution object 2009 and terminal state data 2010. On receiving a message from the message transmitter 2018, the terminal operation execution object 2009 operates on the terminal state data 2010 and transmits the operation result to the message analyzer 2017. Thus, the terminal operation of a subscriber terminal, etc. is simulated.

On receiving a message from the message transmitter 2018, the call model execution object 2011 operates call model state data 2012 and transmits the operation result to the message analyzer 2017. This simulates call models such as a model of a switching operation of a switch of a switching unit, etc., or a model of a calling operation in a switching unit or a service providing node required for executing a service specification.

On receiving a message from the message transmitter 2018, the resource operation execution object 2013 operates resource state data 2014, and the operation result is transmitted to the message analyzer 2017. This simulates the operation of resources such as an output of an announcement and a ringing tone to a terminal.

The communication service specification execution object 2015 executes the communication service specification 2003, sequentially updates the service execution state data 2016 according to the execution result, receives a message from the message transmitter 2018 if necessary, and transmits the message to the message analyzer 2017.

The above described configuration of the third embodiment not only simulates a switching operation of a switching unit, but integrally simulates the control of various hardware and software resources used in a call process among a service providing node, a switching node, and a user terminal.

What is claimed is:

1. A communication service simulator for simulating a communication service specification for a communication network having components including terminals and server nodes which control communication between the terminals, comprising:

communication service specification storage means for storing a communication service specification defined by a user, said communication service specification to be verified based on user messages transmitted to and from the user;

communication service specification simulation means for controlling a simulation of operations of the server nodes based on sequential execution of said communication service specification stored in said communication service specification storage means, and for controlling a state of the sequential execution of said communication service specification based on control messages;

terminal simulation means for controlling a simulation of an operation of at least one of the terminals during the sequential execution of said communication service specification based on the control messages, thereby simulating an input and output operation of the terminals;

call model simulation means for performing a simulation of a switching operation and a calling operation of the server nodes during the sequential execution of said communication service specification based on the control messages;

resource simulation means for performing a simulation of an output operation of the server nodes during the sequential execution of said communication service specification based on the control messages;

human interface means for transmitting the user messages to the user and from the user in response to actual operations performed by the user via an operational terminal included among the terminals, during the sequential execution of said communication service specification; and simulation control means for controlling transmission among said communication service specification simulation means, said terminal simulation means, said call model simulation means, said resource simulation means, and said human interface means based on the control messages and the user messages.

2. The communication service simulator according to claim 1, wherein said communication service specification specifies operation of an intelligent network.

3. The communication service simulator according to claim 1, wherein the user messages to the user comprise one of announcement and ringing tone, and wherein the user messages from the user comprise one of on-hook, off-hook and dialing.

4. A communication service simulator for simulating a communication service specification for a communication network having components, including terminals and server nodes which control communication between said terminals, comprising:

communication service specification storage means for storing the communication service specification, defined by a user, to be verified based on simulating operations;

user-operated input means for inputting operations by a user;

display means for displaying, on a screen, contents of the simulating operations; and simulation means for performing the simulating operations to simulate said communication service specification by displaying on the screen of said display means, each component of the communication network controlled by said communication service specification and operated by the user through said user-operated input means.

5. A communication service simulator as recited in claim 4, further comprising:

communication service specification simulation means for sequentially executing said communication service specification stored in said communication service specification storage means, and controlling a state of execution of said communication service specification, including the server nodes, based on said communication service specification;

terminal simulation means for controlling simulation of operations of the terminals during the execution of said communication service specification;

call model simulation means for performing a simulation of switching operations and calling operations of the components using a call model during the execution of said communication service specification;

resource simulation means for performing a simulation of an output operation of the server nodes during the execution of said communication service specification;

human interface means for transmitting messages to the user and from the user in response to actual operations performed by the user via an operational terminal included among the terminals, during the execution of said communication service specification; and simulation control means for controlling transmission among said communication service specification simulation means, said terminal simulation means, said call model simulation means, said resource simulation means, and said human interface means.

6. The communication service simulator according to claim 5, wherein said communication service specification specifies an intelligent network.

7. A communication service simulator as recited in claim 4, wherein:

said simulation means comprises terminal simulation means for simulating the operation of a terminal, one of said components, by controlling terminal data corresponding to said terminal, and for registering said terminal as said terminal data and displaying said terminal on the screen of said display means when a receiving terminal is unregistered as said terminal data during a simulation of said communication service specification.

8. The communication service simulation according to claim 7, wherein said communication network comprises an intelligent network.

9. A communication service simulator for simulating a communication service specification as recited in claim 4, further comprising:

history storage means for sequentially storing a respective state of each of said components and the user operations inputted by the user through said user-operated input means as history storage contents, and history regenerate/display control means for displaying any portion of the history storage contents of said history storage means on the screen of said display means.

10. The communication service simulation according to claim 9, wherein said communication network comprises an intelligent network.

11. A communication service simulator for simulating a communication service specification as recited in claim 4, further comprising:

simulation process control means provided in said simulation means for copying a simulation process to perform them independently and displaying each of said components to be simulated by each of said simulation processes in a separate screen area corresponding to each of said simulation processes on the screen of said display unit during a simulation of said communication service specification.

12. The communication service simulation according to claim 11, wherein said communication network comprises an intelligent network.

13. A communication service simulator for simulating a communication service specification as recited in claim 4, further comprising:

specified terminal identification information storage means for storing user-specified terminal identification information, and sound output means for outputting a predetermined sound when said predetermined sound is outputted to a terminal specified by identification information stored in said specified terminal identification information storage means during the simulation of said communication service specification.

14. The communication service simulation according to claim 13, wherein said communication network comprises an intelligent network.

15. A communication service simulator for simulating a communication service specification as recited in claim 4, further comprising:

sound output means for outputting a predetermined sound for a predetermined time in synchronism with a change on the screen of said display means of a terminal when said predetermined sound is outputted to said terminal during the simulation of said communication service specification.

16. The communication service simulation according to claim 15, wherein said communication network comprises an intelligent network.

17. A communication service simulator for simulating a communication service specification for a communication network having components including terminals and server nodes which control communication between said terminals, comprising:

communication service specification storage means for storing a communication service specification, defined by a user, to be verified based on user messages transmitted to and from the user;

communication service specification simulation means for executing said communication service specification stored in said communication service specification storage means, controlling a state of the execution of said communication service specification based on control messages and controlling the simulating of operations of the components, including said server nodes, based on said communication service specification;

terminal simulation means for simulating functions of the terminals during the execution of said communication service specification based on the control messages;

call model simulation means for simulating switching and calling operations of the terminals during the execution of said communication service specification based on the control messages;

resource simulation means for performing simulation of output operations of said server nodes during the execution of said communication service specification based on the control messages;

human interface means for transmitting the user messages to and from the user during the execution of said communication service specification; and simulation control means for controlling transmissions among said communication service specification simulation means, said terminal simulation means, said call model simulation means, said resource simulation means, and said human interface means based on the control messages and the user messages.

18. A communication service simulator as recited in claim 17, wherein said call model simulation means simulates one of a switching function of a telephone switching system, the telephone switching system used for executing the communication service specification, and a call-processing operation in a service providing node.

* * * * *